United States Patent
Gross et al.

(10) Patent No.: US 8,528,859 B2
(45) Date of Patent: Sep. 10, 2013

(54) INSTALLATION SYSTEM FOR AN AIRPLANE

(75) Inventors: Claus-Peter Gross, Buxtehude (DE); Oliver Sascha Thomaschewski, Hamburg (DE)

(73) Assignee: Airbus Operations GmbH (DE)

( * ) Notice: Subject to any disclaimer, the term of this patent is extended or adjusted under 35 U.S.C. 154(b) by 878 days.

(21) Appl. No.: 12/218,028

(22) Filed: Jul. 10, 2008

(65) Prior Publication Data

US 2009/0026318 A1 Jan. 29, 2009

Related U.S. Application Data

(60) Provisional application No. 60/959,307, filed on Jul. 11, 2007.

(30) Foreign Application Priority Data

Jul. 11, 2007 (DE) .................. 10 2007 032 233

(51) Int. Cl.
*B64D 11/00* (2006.01)

(52) U.S. Cl.
USPC .................. 244/118.5; 296/37.7; 312/246

(58) Field of Classification Search
USPC .......... 244/118.1, 118.2, 129.4, 137.1, 129.1, 244/118.5; 296/37.7, 37.8; 312/246, 248
See application file for complete search history.

(56) References Cited

U.S. PATENT DOCUMENTS

| | | | | |
|---|---|---|---|---|
| 4,372,510 A * | 2/1983 | Skypala | ................... | 248/58 |
| 5,083,727 A * | 1/1992 | Pompei et al. | ............. | 244/118.6 |
| 5,108,048 A * | 4/1992 | Chang | .................. | 244/118.1 |
| 5,201,831 A * | 4/1993 | Higgins et al. | ................ | 244/119 |
| 5,388,790 A * | 2/1995 | Guthke et al. | ................... | 248/58 |
| 5,420,760 A * | 5/1995 | Ansell et al. | ................... | 361/818 |
| 5,725,293 A * | 3/1998 | Wilkening et al. | ............ | 312/248 |
| 5,730,400 A * | 3/1998 | Rinderer et al. | ............. | 248/68.1 |
| 5,842,668 A | 12/1998 | Spencer | | |
| 6,007,024 A * | 12/1999 | Stephan | ..................... | 244/118.1 |
| 6,249,913 B1* | 6/2001 | Galipeau et al. | ................ | 725/76 |
| 6,536,710 B1* | 3/2003 | Bobzien et al. | ............... | 244/119 |
| 6,585,189 B1* | 7/2003 | Smallhorn | ................. | 244/118.5 |
| 6,824,104 B2* | 11/2004 | Smallhorn | ................. | 244/118.5 |
| 6,883,753 B1* | 4/2005 | Scown | ........................ | 244/118.1 |
| D516,496 S * | 3/2006 | Guard et al. | ................. | D12/345 |
| 7,059,565 B2 | 6/2006 | Scown et al. | | |
| 7,188,805 B2* | 3/2007 | Henley et al. | ............. | 244/118.5 |
| 7,325,772 B1* | 2/2008 | Hanewinkel et al. | ...... | 244/129.4 |
| 7,445,188 B2* | 11/2008 | Lamparter | .................... | 248/326 |
| 7,448,574 B2* | 11/2008 | Young et al. | ............... | 244/118.5 |
| 7,469,860 B2* | 12/2008 | Young et al. | ............... | 244/118.5 |
| 7,527,221 B2* | 5/2009 | Humfeldt et al. | .......... | 244/118.5 |
| 7,931,047 B2* | 4/2011 | Gonnsen et al. | ........... | 137/899.2 |

(Continued)

FOREIGN PATENT DOCUMENTS

| | | |
|---|---|---|
| DE | 19639339 A1 | 3/1998 |
| DE | 19955397 C1 | 1/2001 |

(Continued)

*Primary Examiner* — Benjamin P Lee

(74) *Attorney, Agent, or Firm* — Lerner, David, Littenberg, Krumholz & Mentlik, LLP

(57) ABSTRACT

An exemplary embodiment of the present invention indicates an installation system for an airplane for securing interior equipment, which exhibits longitudinal and transverse rails. The transverse rails are designed as peripheral rails, and exhibit perforations to which the interior equipment can be secured.

7 Claims, 16 Drawing Sheets

(56) References Cited

U.S. PATENT DOCUMENTS

| | | | |
|---|---|---|---|
| 7,938,362 B2 * | 5/2011 | Kismarton et al. | 244/117 R |
| 2003/0106963 A1 * | 6/2003 | Smallhorn | 244/125 |
| 2004/0129445 A1 * | 7/2004 | Winkelbach et al. | 174/76 |
| 2004/0195446 A1 * | 10/2004 | Smallhorn | 244/118.5 |
| 2005/0044712 A1 | 3/2005 | Gideon et al. | |
| 2005/0236523 A1 * | 10/2005 | Schwartz et al. | 244/119 |
| 2006/0091259 A1 * | 5/2006 | Young et al. | 244/119 |
| 2006/0237585 A1 * | 10/2006 | Lau et al. | 244/118.5 |
| 2008/0277527 A1 * | 11/2008 | Fokken et al. | 244/118.1 |
| 2009/0159744 A1 * | 6/2009 | Beentjes et al. | 244/118.1 |
| 2010/0155530 A1 * | 6/2010 | Tsirangelos et al. | 244/118.5 |
| 2010/0213314 A1 * | 8/2010 | Haselmeier et al. | 244/119 |
| 2010/0243805 A1 | 9/2010 | Gross et al. | |
| 2010/0252684 A1 * | 10/2010 | Stephan | 244/131 |
| 2011/0163203 A2 * | 7/2011 | Tsirangelos et al. | 244/118.5 |

FOREIGN PATENT DOCUMENTS

| | | |
|---|---|---|
| DE | 10017410 | 10/2001 |
| DE | 102007019821 A1 | 11/2008 |
| DE | 102007032235 A1 | 1/2009 |
| DE | 102007060253 A1 | 6/2009 |
| EP | 0514957 A1 | 11/1992 |
| EP | 861781 | 9/1998 |

* cited by examiner

INSTALLATION SYSTEM FOR AN AIRPLANE

CROSS-REFERENCE TO RELATED APPLICATIONS

This application claims the benefit of the filing date of U.S. Provisional Patent Application No. 60/959,307 filed Jul. 11, 2007, the disclosure of which is hereby incorporated herein by reference.

BACKGROUND OF THE INVENTION

The invention relates to the cabin and system installation in aircraft. In particular, the invention relates to an installation system for an aircraft for joining local components situated transverse to a central axis of the aircraft, the use of such an installation system in an aircraft, and an airplane with such an installation system. Further, the present invention relates to a rail for cabin and system installation with integrated, expanded functionalities for an aircraft. The present invention also relates to a rail system for an aircraft, an aircraft with a rail and the use of a rail in an aircraft.

Loads from system installations and cabin components are today mainly introduced by way of individual mounts (brackets) into the primary structure of the fuselage. The brackets or mounts are here typically secured to the frames, which absorb the loads from the system. FIG. 1 shows this based on the example of a baggage storage compartment (hat rack or bin). These brackets most often have mechanical attachment points for the loads, and are drilled into the outer skin, stringers or frames of the aircraft. During the development of aircraft with a primary structure comprised of carbon fiber reinforced plastics (CFP), the question of attaching these brackets in the carbon fiber-reinforced plastic layer has become a technical challenge, since boreholes in carbon fiber-reinforced plastics can lead to a localized weakening of the material. This problem can also be present in so-called hybrid structures, in which the fuselage of the aircraft consists of a CFP/metal mixture. Attaching the brackets to the frames can here mean that only discrete attachment points are available for loads, so that installation depends on the frame grid in the longitudinal and peripheral direction. The installation and hence positioning of a load or component can also entail measuring outlay, since the exact positioning of the bracket must be determined for exactly positioning the component.

Another important aspect encountered during the use of CFP (German: CFK) for aircraft fuselages is that the fuselage no longer exhibits a sufficient electrical conductivity. Electrical functionalities that previously could be provided owing to the good electrical conductivity of the metal fuselage of the aircraft may now no longer be present in the poorly conducting fiber fuselages. As a consequence, CFP fuselages may give rise to added weight in comparison to previous solutions due to electrical functions that must be separately integrated, such as return circuits and electromagnetic screening. In particular so-called raceways must be mentioned here; these are U-shaped cavities made of conductive material, in which unscreened cables can be run, and thereby screened.

U.S. Pat. No. 7,059,565 relates to longitudinal rails and brackets for installing system components or interior equipment (apparatuses) in an airplane. The longitudinal rails are here secured to the frames, and exhibit holes to which the interior apparatuses can be attached. The longitudinal rails are joined to the frames via corresponding brackets.

Attaching the interior apparatuses to the perforated longitudinal carriers and securing the longitudinal carriers to the frames by means of individual brackets places a load on the frames. The attachment points of the longitudinal carriers are predetermined by the distance of the frames (frame grid dependence). Numerous unforeseeable bracket positions may prevent an optimal frame configuration, since new attachment points may be defined on already existing frames. In addition, known mounting concepts may require a large number of different parts and a high assembly and production outlay. Localized holes in the insulation are often required for the individual brackets.

SUMMARY OF THE INVENTION

The invention relates to an installation system for an aircraft, the use of an installation system and an aircraft with such an installation system with the features in the independent claims.

It should be noted that the exemplary embodiments of the installation system described below also relate equally to the application and the aircraft.

One exemplary embodiment of the present invention provides an installation system for an aircraft for joining localized components situated transversely or longitudinally to the central axis of the airplane, wherein the installation system exhibits a first and second longitudinal rail and a first and second traverse, wherein the traverses and longitudinal rails are joined to form an installation system, and wherein the traverses are designed as peripheral rails to prepare the attachment of components along a periphery of the aircraft fuselage.

In other words, the installation system encompasses several rails that run in the longitudinal direction of the aircraft fuselage and several transverse elements (traverses) that run along a periphery of the aircraft fuselage, i.e., are correspondingly curved. The longitudinal rails and transverse elements are interconnected to form an overall system, to which the interior apparatuses (components) can then be secured.

This may provide for an improved installation of interior apparatuses in airplanes. Furthermore, an improved rail for cabin and system installation in an aircraft may be provided, which integrates the functions of mechanical joining and electrical aspects into a component.

Brackets need no longer be secured to the frames of the aircraft for installing a hat rack, for example. New additional interior apparatuses are installed by very simply attaching the interior apparatuses to the installation system. It may no longer be necessary to engage the frames or skin of the aircraft. As a result, the frames can be optimized mechanically and in terms of weight, since later installations (for example by drilling the frames, riveting, screwing or securing brackets that engage into the frames) are no longer required. The installation system is secured to the frames and other parts belonging to the primary structure of the aircraft. Subsequent installations are now just performed on the system itself.

The installation system according to an exemplary embodiment of the present invention is very well suited for joining localized components situated transverse to the central axis of the airplane. Continuous structures like pipes or cables can also be incorporated on the installation system.

In another exemplary embodiment of the present invention, the components joined to the installation system are designed as baggage storage compartments (hat racks or bins) or side wall panels and system components.

In another exemplary embodiment of the present invention, the traverses exhibit an attachment area for attachment to the longitudinal rails.

As a result, the longitudinal rails may be secured to the primary structure in a first step. In a second step, the traverses are then secured to the longitudinal rails.

In another exemplary embodiment of the present invention, the longitudinal rails exhibit an attachment area for attachment to the traverses.

For example, the traverses may hence be manufactured in a simple manner, and are threaded, inserted or "snapped into" the corresponding attachment areas of the longitudinal rails.

The traverse may be accommodated between any number of rails desired, in particular secured to a single rail. Further, it may also be possible to arrange several mounting points not on rails, but rather on individual fixed points (like a conventional bracket).

In another exemplary embodiment of the present invention, the first traverse exhibits a bearing area for mounting purposes between the first and second longitudinal rail. The bearing area may make it possible to additionally support or fix the traverse.

In another exemplary embodiment of the present invention, the first traverse exhibits a bearing area for mounting purposes between the first longitudinal rail and a bracket.

In another exemplary embodiment of the present invention, the first traverse exhibits a bearing area for mounting purposes between the first longitudinal rail and a fixed point.

In another exemplary embodiment of the present invention, the installation system is designed for integration into a primary structure of the airplane, so that the installation system constitutes part of the primary structure.

Integrating the installation system into the primary structure of the airplane may allow the installation system according to the invention to actually contribute to the stability of the airplane fuselage. On the one hand, the installation system may provide an improved load introduction into the frames, since it helps to more uniformly distribute the loads to the frames. In addition, the installation system may help further reinforce the airplane fuselage.

In another exemplary embodiment of the present invention, the traverses exhibit a thickness of about one millimeter. The elements involved here are hence light and cost-effective. The traverses can here be given the most varied of profile shapes, such as C, T, I, and box-like shapes.

In another exemplary embodiment of the present invention, the traverses are designed using various materials and shapes depending on the load and local functional requirements.

In another exemplary embodiment of the present invention, traverse manufacture also encompasses an injection molding or machining step.

In another exemplary embodiment of the present invention, traverse manufacture encompasses a method for manufacturing fiber-reinforced plastics (FRP).

In another exemplary embodiment of the present invention, traverse manufacture encompasses extrusion, injection molding and machining, which may be performed in a simple and cost-effective manner.

In another exemplary embodiment of the present invention, the first longitudinal rails and first traverse are electrically conductive. As a result, the installation system may be used for returning electrical current and screening. For example, the system provides a Faraday cage if installed around the entire airplane periphery or large areas of the periphery. These properties may be especially important in the case of carbon fiber fuselages.

In another exemplary embodiment of the present invention, the first longitudinal rail exhibits a cable channel, wherein the cable channel is designed to provide an integrated electrical functionality.

For example, this integrated electrical functionality involves the provision of a return line (in this case, the cable channel is designed as part of the return line network) and/or the provision of an electromagnetic screening for an electrical conductor inside the channel (in this case, the cable channel consists at least in part of an electrically conductive jacket into which the cable runs).

The longitudinal rails and/or traverses can be designed to absorb loads of varying intensity.

In another exemplary embodiment of the present invention, the installation system is designed as a modular click system.

Depending on the load to be installed, the bent traverses and/or longitudinal rails may hence be designed with a different level of stability. Various materials may here be used, such as plastic, aluminum, carbon fiber or steel. The modular structure of the system may make it easy to replace the individual components, depending on the load requirement requirement.

In another exemplary embodiment of the present invention, the first longitudinal rails and first traverse exhibit mechanical bonding points in the form of perforations or boreholes, wherein the mechanical bonding points are designed for mechanically securing loads. This may enable a variable, rapid installation of final apparatuses (interior equipment, hat racks, bins, etc.). In addition, the skin of the airplane may be relieved, since the system absorbs the loads and distributes them uniformly on the primary structure. Interior equipment need not be directly secured to the skin.

In another exemplary embodiment of the present invention, the mechanical bonding points are spaced apart, for example, in a grid with a respective distance of 2.54 centimeters (1 inch).

The installation system according to the invention represents an additional framework for relieving the outer skin. The rails and traverses can be integrated into the airplane as part of the primary structure, and serve for routing cables, guiding electrical signals, diverting surge currents, as well as for introducing a load into the airplane skin.

In another exemplary embodiment of the present invention, the installation system is designed for securing a baggage storage compartment on the first longitudinal rail and the second longitudinal rail, wherein the mechanical bonding points of the first longitudinal rail are situated over a center of gravity of the baggage storage compartment, so that these bonding points only bear z-loads of the baggage storage compartment.

In another exemplary embodiment of the present invention, the installation system further exhibits a bearing bracing for accommodating a baggage storage compartment on the first longitudinal rail and the second longitudinal rail.

One exemplary embodiment of the present invention provides a rail for cabin and system installation in an aircraft, wherein the rail exhibits an attachment area, at least one mechanical bonding point and a cable installation space. The attachment area is designed for securing the rail to a structure, in particular the primary structure of the aircraft, the mechanical bonding point is designed for mechanically bonding loads, and the cable installation space is designed to provide an integrated functionality. The mechanical bonding point(s) of the rail according to the invention can here be designed in such a way as to yield a standardized distance for the loads to be introduced. For example, the bonding points are each separated from each other by a distance of 2.54 cm, which corresponds to exactly one inch. The loads to be introduced from the cabins and system installation can include cladding, compartments, monuments, entertainment systems, air conditioning systems and the like. The rail, and hence the mechanical bonding points, can be designed in the longitudinal direction of the aircraft, thereby yielding the capability of "inch by inch" installation of components given a potential standardized distance of one inch for the attachment points. This type of potential standardization can play an important role given the increasing importance of reconstruction processes within the aircraft. This is because the coordinates of a grid can be output, and a prescribed architecture can be quickly adapted.

The fact that the loads associated with the cabin and system components in the present invention are introduced via the mechanical bonding points may eliminate the need for renewed drilling in the fuselage of the aircraft during any conversion processes involving the cabin architecture for a conventional mount, such as brackets. This characteristic feature is becoming increasingly important precisely in view of the use of CFP fuselages or also hybrid structures made of CFP and metal. In these materials, additional drilling in the primary structure of the aircraft can lead to localized weakening of the material, which the present invention can avoid.

The cabin installation space may here be used for the most varied of media, e.g., for cables, pipe conduits, mechanical elements or controls, media such as coolants, water, air, hydraulic oil, thereby providing an expanded functionality. The rail structure itself can here comprise a pipe. Further, the rail can also consist of a completely non-conductive material. As a result, the expanded functionality can involve using the rail as part of the air conditioner piping. Another possibility involves using the rail as part of the hydraulic lines. In yet another possible integrated functionality, the rail may be used as part of the mechanical flight control system. The rail may here be designed as a comb, with several cable installation spaces, thereby enabling the simultaneous integration of various functionalities.

The integrated expanded functionality can here be an integrated electrical functionality, for example.

In the case of a CFP fuselage or when using hybrid materials, such as CFP-metal mixtures, the screening of cables and preparation of an electrical return line network become particularly important. To this end, the invention provides that both the screening cable installation space (so-called raceway) and the electrical functionality of the return line be integrated into the rail, which had been enabled in metal aircraft fuselages by their electrical conductivity. An integrated electrical functionality, for example the provision of a Faraday cage, can hence be for the aircraft as formed by the outer skin in the case of a metal aircraft.

As a result, the integrated electrical functionality can represent a lightning protection device. Another integrated electrical functionality provided by the cable installation space can be an electromagnetic screening of an electrical conductor within the cable installation space. The screening can here be made available solely by the cable installation space, or via screening cable channels incorporated in the cable installation space, for example. The cable installation space or cable channel are here at least partially made out of an electrically conductive material, which envelops the cable installation space or cable channel in its periphery. This electrically conductive form, which does not necessarily have to be designed as a closed jacket, protects the inner core area of the cable installation space or cable channel against electromagnetic signals. This may ensure that the electrical conductor within the cable installation space or cable channel will operate unimpeded by electromagnetic signals.

Since poorly conductive fiber fuselages may often make it necessary to assemble a metal return line network, the integrated electrical functionality of the cable installation space can involve designing it as part of a return line network. This may make it possible to provide a neutral conductor over the entire aircraft.

Integrating this expanded functionality may make it possible to largely to completely offset excess weight in aircraft. Precisely the latest efforts to realize large-capacity aircraft are placing a greater weight on the capability to avoid excess weight resulting from function integration.

In another exemplary embodiment of the present invention, the expanded functionality provided by the cabin installation space is an electrical functionality.

In the case of a CFP fuselage or when using hybrid materials, such as CFP-metal mixtures, the screening of cables and preparation of an electrical return line network become particularly important. To this end, the invention provides that both the screening cable installation space (so-called raceway) and the electrical functionality of the return line be integrated into the rail, which had been enabled in metal aircraft fuselages by their electrical conductivity. An integrated electrical functionality, for example the provision of a Faraday cage, can hence be for the aircraft as formed by the outer skin in the case of a metal aircraft. As a result, the integrated electrical functionality can represent a lightning protection device. Another integrated electrical functionality provided by the cable installation space can be an electromagnetic screening of an electrical conductor within the cable installation space. The material boundary of the cable installation space is here at least partially made out of an electrically conductive material, which envelops the cable installation space or cable channel in its periphery, which can be open or closed. This electrically conductive form protects the inner core area of the cable installation space against electromagnetic signals. This ensures that the electrical conductor within the cable installation space will operate unimpeded by electromagnetic signals.

Since poorly conductive fiber fuselages often make it necessary to assemble a metal return line network, the integrated electrical functionality of the cable installation space can involve designing it as part of a return line network. This may make it possible to provide a neutral conductor over the entire aircraft.

Integrating these electrical functions may make it possible to largely to completely compensate for excess weight in CFP fuselages. Precisely the latest efforts to realize large-capacity aircraft are placing a greater weight on the capability to avoid excess weight resulting from function integration.

In another exemplary embodiment of the present invention, the rail exhibits a cable installation space consisting at least partially of an electrical conductive jacket. The jacket for electromagnetically screening an electrical conductor is here set up inside the cable installation space.

To prevent the dielectric line of a conductor within the cable installation space from becoming disrupted by exposure to outside electromagnetic fields, the jacket of the cable installation space can consist at least partially of an electrically conductive material. The surrounding material jacket of the cable installation space can here be open or even closed. However, the screening can also be provided by cable channels laid in the cable installation space. The screening need not exhibit closed jacket surfaces. For example, it can be a more or less narrowly woven wire mesh of the kind used in an exemplary embodiment for commercial coaxial cable. An environment consisting of conductive material on three sides scan also be sufficient (raceway).

In another exemplary embodiment of the present invention, at least parts of the rail are designed as a section of a return line network To provide a return line for an aircraft in the entire area, the fuselage itself can assume this function in electrically conductive fuselages. This is no longer the case given the lack of electrical conductivity in the increasingly important CFP and hybrid fuselages. The rail itself can be designed as part of a return line network if made out of an electrically conductive material. However, it is also possible to provide a return line by way of a cable channel that can either itself be electrically conductive or contain an electrical conductor inside, even against the backdrop of such non-conductive fiber fuselages. This cable channel can here be secured in the cable installation space. This provision of a so-called ground may make it possible to increase the safety in the aircraft, while saving on weight as a result of system integration.

In another embodiment of the present invention, the rail is designed for assembly in a longitudinal direction of the aircraft.

The longitudinal direction of the aircraft is here the direction shown along the connection of the tail and aircraft tip. The standardized distance between the mechanical bonding points of the rail may make it possible to secure cabin components or system installation elements in a standardized distance from each other along this direction, also known to the expert as the x-direction. This may make it possible to install a clear and rapidly adaptable architecture of cabin components and system installation elements along the x-direction. Therefore, this alignment of the rail in the x-direction makes it possible to specify coordinates in a grid on which a cabin component is to be secured. This may permit a continuous provision of attachment points or securing points for such cabin components, regardless of the frame grid in the longitudinal and peripheral direction. At the same time, there is no longer a need for the previously required measuring outlay for precisely determining the bracket position. The rail may here be assembled in all possible angles into the cabin area (x-y plane) and in all possible angles on the fuselage structure (x-z plane).

In another exemplary embodiment of the present invention, the rail exhibits an expanded H-profile in a cross section perpendicular to a longitudinal axis of the rail. The expanded H-profile here exhibits a first perpendicular area at a boundary section, which abuts a first horizontal area up to a second perpendicular area. The first horizontal area here has a minimum width between the first and second perpendicular area, thereby giving rise to a cabin installation space both on the upper side and lower side of the horizontal area. A second, final horizontal area abuts the second perpendicular area, and accommodates the mechanical bonding points.

This exemplary embodiment of the present invention is represented three-dimensionally on FIG. 1, while the described cross section is shown on FIG. 2. The cross section is here shown perpendicular to the longitudinal direction of the rail, which the expert designates as the x-direction in an aircraft. Let it be noted for safety purposes that the scope of protection of this exemplary embodiment of the present invention is not limited by the fact that the described cross section is rotated in the space, thereby necessitating other orientative and descriptive terms. Therefore, the terms upper and lower side must be regarded as relative. As shown in FIG. 5, the first perpendicular area can be used to secure the rail to the primary structure of the aircraft. As evident from FIG. 5, another assembly rail can incorporate the rail according to the invention as an exemplary embodiment for attachment with the first perpendicular area, and in turn be attached to the frames. Clearly visible here is the second, final, horizontal area of the rail, which bears the bonding points. To ensure the integration of electrical functionalities into the rail structure, this exemplary embodiment hence specifies a minimum distance between the two perpendicular areas, in which the cable channels are located above or below the horizontal area lying in between. Cables, cable bundles or cable channels can be laid in these cavities enclosed on three sides, and electromagnetically screened by the enveloping rail structure. Let it be noted that the depicted expanded H profile is an exemplary embodiment. Other profiles are also conceivable, e.g., with comb-like raceways. This comb-like configuration of the rails with several cable installation spaces is described extensively on FIG. 10 and in the accompanying specification.

In another embodiment of the present invention, the rail has a first and second perpendicular area in the cross section perpendicular to a longitudinal axis of the rail. Situated between the two perpendicular areas here is the cable installation space, which is designed as a load-bearing element of the rail. A final, horizontal area accommodating the mechanical bonding points abuts the second perpendicular area.

Therefore, this exemplary embodiment of the present invention no longer exhibits a horizontal area between the two perpendicular areas as in the previous exemplary embodiment, but rather a cable installation space that can consist of only one or several cable channels, for example. The cable installation space can here be used for the most varied of media, e.g., for cables, pipe conduits, mechanical elements or controls, media such as coolants, water, air, hydraulic oil, thereby providing an expanded functionality. The rail structure itself can here comprise a pipe. By eliminating the horizontal area between the two perpendicular areas, the weight can be further reduced during this integration of electrical functionalities in the mechanical rail. In order to enable standardization based on inch-by-inch installation here as well, a first horizontal area abuts the second perpendicular area, and accommodates the mechanical bonding points for cabin components such as seats, seat groups, cabinets, recreation and sleep modules, and other components. As a result, this exemplary embodiment of the present invention also provides a continuous attachment independently of the frame grid in a longitudinal and peripheral direction for cabin components. The integrated cable channel can here be used for integrating electrical functionalities. For example, the cable channel can be used for screening an electrical conductor against electromagnetic fields. The jacket of the cable channels would here have to consist at least partially of an electrically conductive material. The cable channel can also be used as part of a return line network. However, an integrated structure in the entire aircraft fuselage can also serve as a Faraday cage, which can be formed by the electrical conductors in these cable channels.

In another exemplary embodiment of the present invention, the mechanical bonding points are each spaced 2.54 cm apart.

This standardized distance of 2.54 cm (=1 inch) may make it possible to easily and precisely indicate the coordinates of a grid. This may be advantageous in conjunction with the need for accelerated assembly or frequently encountered conversion processes of the cabin design. As a result, a clear and rapidly adaptable architecture can be made available for the cabin design. Therefore, this one inch distance between the bonding points enables an "inch-by-inch" attachment. Another advantage in addition to providing grid coordinates is making available continuous attachment points independently of the frame grid in the longitudinal and peripheral direction. This attachment of cabin components, which does not rely upon a borehole in the CFP fuselage, is showing great potential for application precisely in the increasingly important CFP fuselages of aircraft. In addition, this solution eliminates the need for the previously required measuring outlay for precisely determining the bracket position.

In another exemplary embodiment of the present invention, the rail is at least partially made out of electrically conductive material.

To provide an electrical functionality, the rail can consist at least partially of an electrically conductive material.

If the configuration of a return line network, a lightning protection device, or some other design of a Faraday cage may make it necessary that the entire rail be electrically conductive, this rail can consist of electrically conductive material in its entire periphery. It is here possible for the cable channel inside the rail to both consist of non-conductive material and itself represent an electrical conductor.

Another exemplary embodiment of the present invention indicates a rail system for an aircraft, wherein the rail system exhibits a plurality of rails.

To enable all advantages and functions of the present invention for an entire aircraft, the rails may be designed in such a way that they can be interconnected to form a single rail system. The interconnection of several rails here leaves the mechanical and electrical functionality of the rail completely intact. In other words, interconnection enables an inch-by-inch installation over a much longer area. The ability to indicate coordinates for the cabin components is also retained. This provides a standardized distance of components and loads for a system installation for the entire aircraft. In addition, all electrical functionalities integrated into the individual rail are made available for the entire aircraft after joining together several rails. This makes it possible to realize a Faraday cage, a lightning arrester, a screening for an electrical conductor over the entire length of the aircraft, or to integrate an electrical conductor into a return line network. These mechanical and electrical functionalities are here completely undisrupted even when interconnecting several rails, and even remains intact when system installation loads are secured to the rails.

Another exemplary embodiment of the present invention indicates a rail system for an aircraft, wherein the rail system exhibits a first rail with a first end region designed to engage into a second end region of a second rail. The two end areas of the rails are here designed in such a way as to also provide the integrated electrical functionality in the transition between the two end regions when the two rails are joined together.

The end regions can here exhibit a conductive plug connection, for example, which enables the secure joining of two rails according to the invention, while simultaneously maintaining the electrical functionality. However, it is also possible to have a screwed connection, a conductive adhesive bond or a connection established with an electrical coupling element, such as lamp-wire connectors. Also important is that the mechanical attachment of loads from the system installation, such as cabin components and other elements, exert absolutely no influence on the functionality of the electrical devices inside the rails.

Another exemplary embodiment of the present invention provides an aircraft that exhibits a corresponding rail.

In addition, another exemplary embodiment of the present invention provides the use of a corresponding rail in an aircraft.

Another exemplary embodiment of the present invention provides the use of an installation system described above in an aircraft.

In addition, another exemplary embodiment of the present invention provides an aircraft with the installation system described above.

Exemplary embodiments of the present invention will be described below with reference to the figures.

DETAILED DESCRIPTION

The views in the figures are schematic, and not to scale.

The same reference numbers are used in the following description of the figures for identical or similar elements.

Figure 1:
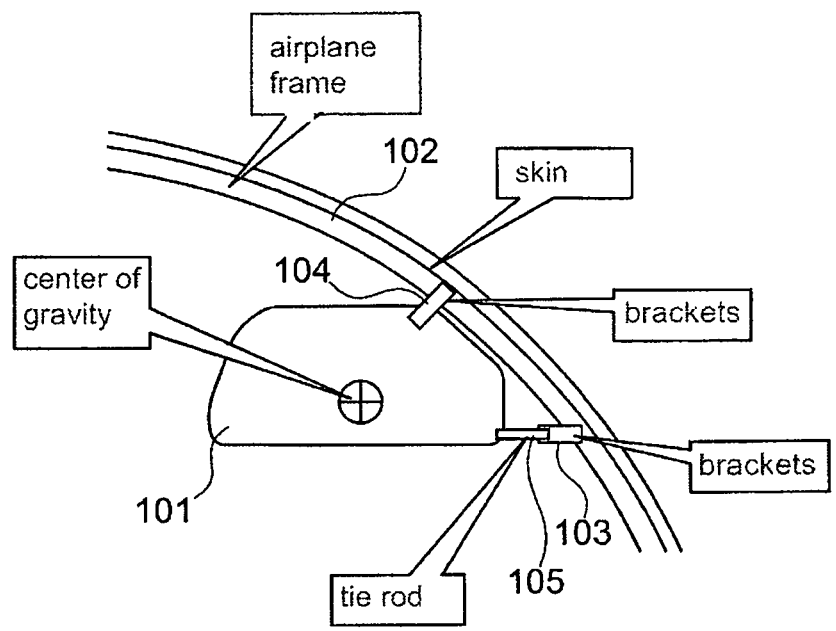
FIG. 1 shows a diagrammatic cross sectional view of a bracket for a baggage storage compartment in an airplane.

FIG. 1 shows a schematic sectional view of a baggage storage compartment 101, which is secured via mounts or brackets 103, 104 and the tie rod 105 to an airplane frame 102. The loads of the hat rack 101 are locally transmitted to the frame 102 via the brackets 103, 104.

Figure 2:
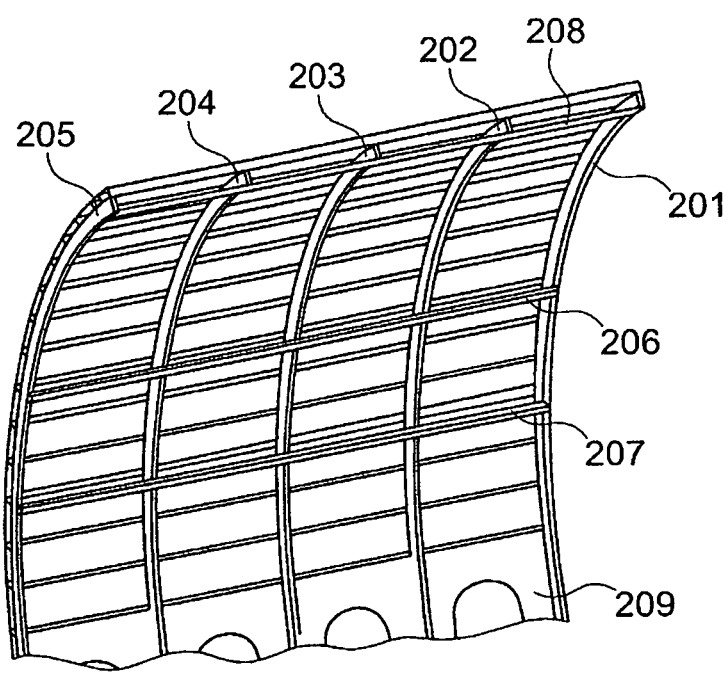
FIG. 2 shows a section of an airplane skin with frames and longitudinal rails.

FIG. 2 shows an installation system having longitudinal rails 206, 207, 208, which are secured to the frames 201, 202, 203, 204 and 205. The frames 201 to 205 carry the outer skin 209, and constitute part of the primary structure of the airplane.

Figure 3:
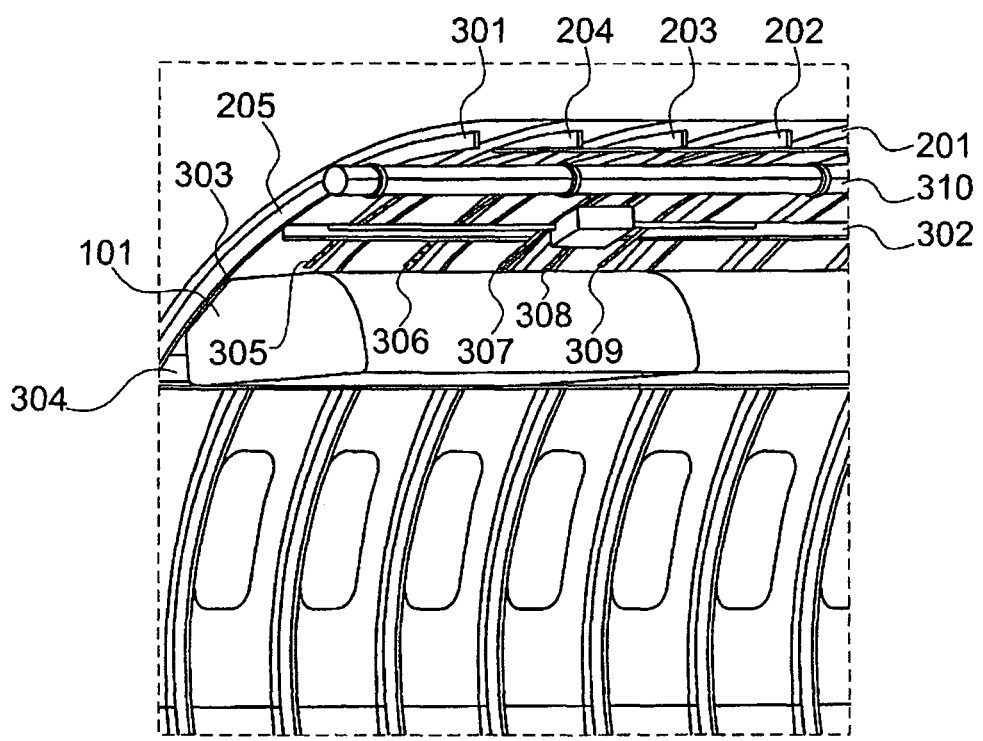
FIG. 3 shows an installation system with hat racks and systems according to an exemplary embodiment of the present invention.

FIG. 3 shows an installation system according to an exemplary embodiment of the present invention, which is integrated into the primary structure of the airplane. FIG. 3 illustrates the installation of cables, pipes and devices. Particularly evident is the is the capability of positioning independently of the frames.

The installation system encompasses longitudinal rails 301, 302, 303 and 304. The installation system also exhibits traverses 305, 306, 307, 308 and 309, which are secured to the longitudinal rails 301, 302, 303, 304. The entire installation system is secured to the frames 201, 202, 203, 204 and 205.

The hat rack chain 101 is secured to the longitudinal rails 302 and 304. The rail 302 here lies directly over the center of gravity of the baggage storage compartment chain (hat rack chain) 101, thereby making it possible to suspend individual baggage storage compartments so as not to damage any material. Therefore, the lower rail 304 serves primarily to support the baggage storage compartments 101.

Additional installations are also introduced in the installation system. For example, a pipe 310 is secured to the traverses.

Figure 4:
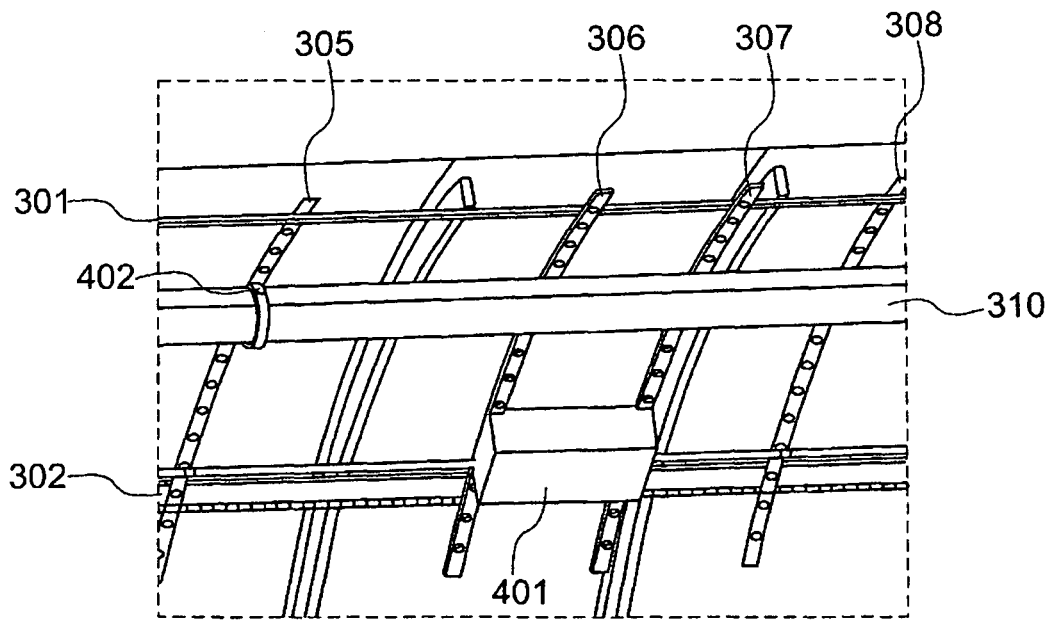
FIG. 4 shows an installation system with various installations according to another exemplary embodiment of the present invention.

FIG. 4 shows another exemplary embodiment of the installation system according to the invention. As evident from FIG. 4, the pipe 310 is secured to the traverse 305 via a corresponding strap 402. In addition, another installation element 401 is secured to the traverses 306, 307 in the form of a box.

The traverses 305, 306, 307 and 308 exhibit perforations or boreholes, which are arranged at constant distance from each other, for example. These distances usually involve distances of one inch (2.54 centimeters). Further, the traverses are adapted to the hull geometry. The resultant curved shape is mechanically very stable. Since the traverses and/or the longitudinal rails can exhibit various profiles and consist of different materials, use can be made of rails/traverses optimized mechanically or by weight, depending on the load. The installation system can be modularly assembled and packaged, depending on the application. The grids (perforations, boreholes) on the traverses provide bonding points for standardized system brackets.

Figure 5:
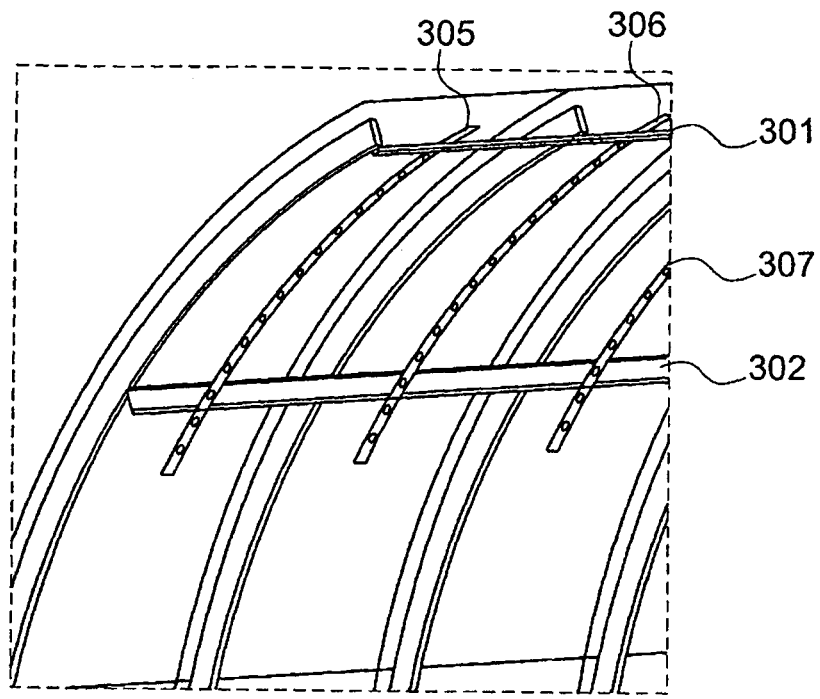
FIG. 5 shows a schematic drawing of an installation system according to another exemplary embodiment of the present invention.

FIG. 5 shows another exemplary embodiment of an installation system according to the invention, which exhibits several traverses 305, 306, 307 and several longitudinal rails 301, 302.

Figure 6:
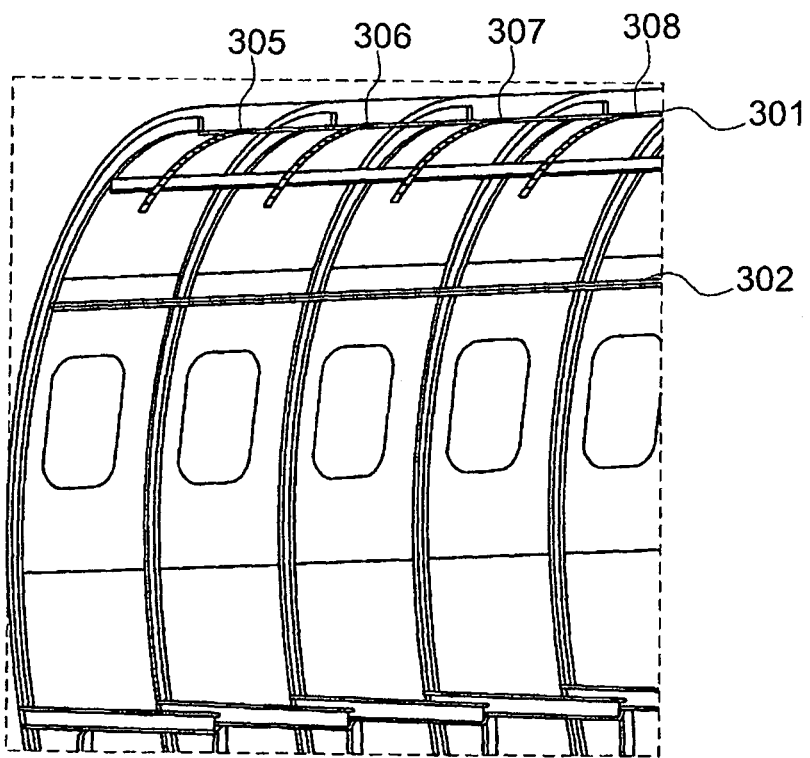
FIG. 6 shows an installation system according to another exemplary embodiment of the present invention.

FIG. 6 shows another exemplary embodiment of an installation system according to the invention, which is secured in the ceiling of the airplane.

Figure 7:
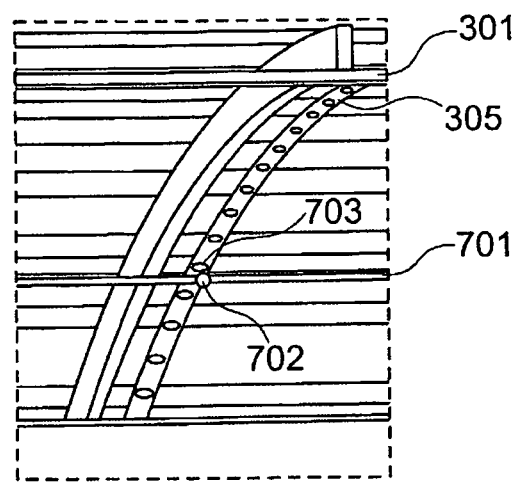
FIG. 7 shows a section from an installation system according to another exemplary embodiment of the present invention.

FIG. 7 shows a section of an installation system according to an exemplary embodiment of the invention with a longitudinal rail 301 and a traverse 305, on which a cable 701 is installed. The cable is installed via a so-called snap-click mechanism, by pushing the attachment 702 through which the cable 701 is routed into the corresponding borehole 703 of the traverse 305 until it latches therein. This enables a simple and individual installation of individual cables, cable harnesses, pipe conduits or interior equipment, for example.

Figure 8:
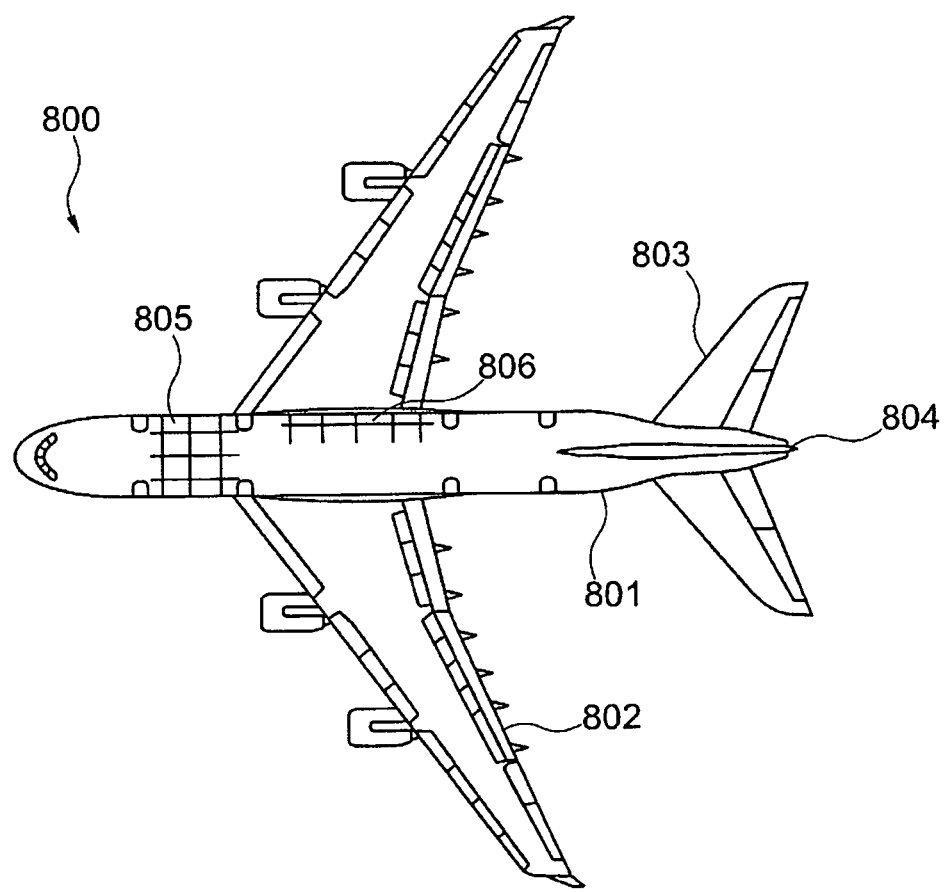
FIG. 8 shows an airplane with installation systems according to the invention according to an exemplary embodiment of the present invention.

FIG. 8 shows a diagrammatic view of an airplane 800, which exhibits a fuselage 801, bearing surfaces 802, elevator unit 803 and rudder unit 804. The hull 801 incorporates installation systems 805, 806 according to an exemplary embodiment of the invention. As evident from FIG. 8, these installation systems 805, 806 can be varyingly dimensioned. The system 805 is one that extends over half the periphery of the airplane fuselage, so that all ceiling and wall installations in the cabin can be implemented in this airplane section via the installation system 805.

By contrast, the installation system 806 is one that is located only on the right side of the cabin, and not in the ceiling area. However, entirely different configurations of the installation system are possible, depending on what kind of components are to be installed thereupon.

For example, the system 805 is designed in such a way as to provide a Faraday cage that protects the flight passengers against lightning strikes.

Figure 9:
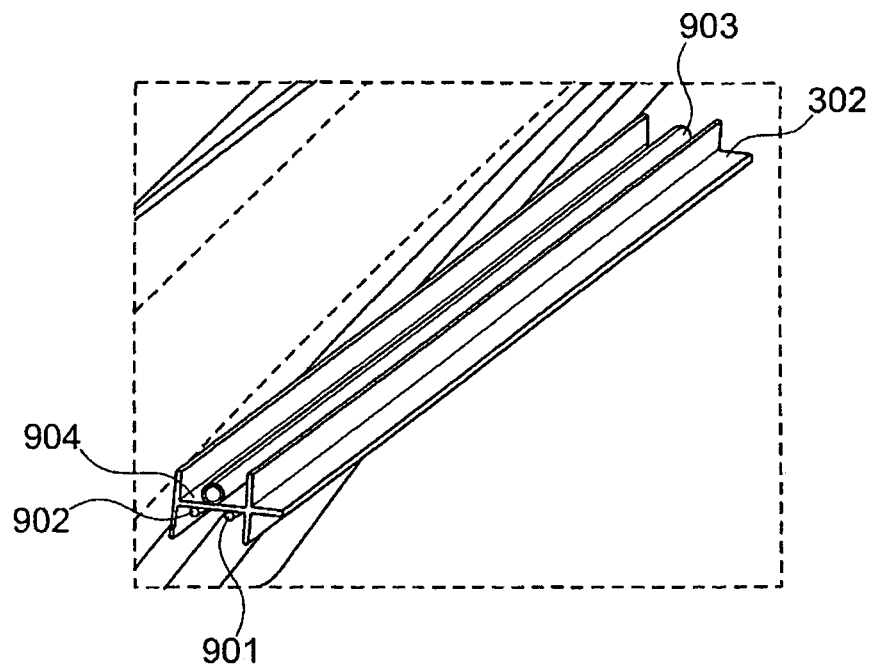
FIG. 9 shows a longitudinal rail of an installation system according to another exemplary embodiment of the present invention.

FIG. 9 shows an exemplary embodiment of a longitudinal rail 302. The rail 302 exhibits an expanded H-profile, and further encompasses three cable channels 901, 902, 903 through which lines can be routed. The cable channels 901, 902, 903 are secured to the cross bracing 904 of the H-profile, and have a conductive jacket, thereby screening the electrical lines running therein. This jacket can also be used for returning electrical current. Cable looms ore individual cables can also be used instead of cable channels.

The installation system according to an exemplary embodiment of the invention is characterized by a high flexibility as the result of continuous attachment points independently of the frame grid in a longitudinal and peripheral direction. In addition, it may be easy to install and can be quickly and flexibly fabricated and/or modified, since the bracket positions can be described by the coordinates of a corresponding grid (perforated pattern). The brackets can be precisely positioned without any measuring outlay, since the corresponding attachment points have already been defined.

In addition, the load-bearing capability can be verified without any complex structural examinations. In particular, the installation system can be used in the area of carbon fiber-reinforced plastic (CFP)/metal hybrid structures and dual shells, so that boreholes in these materials may be avoided.

In addition, the insulation does not have to be locally interrupted at individual brackets. The system may make it possible to also use robust metal bonding structures in the fiber environment. Further, the installation system can be used as an electrical conductor if equipped with the corresponding conductive elements.

The implemented snap-and-click principle may make it easy to individually and modularly fabricate installation systems.

This may make it possible to achieve high numbers of identical parts. Adaptation via the modular principle may yield a weight reduction and various special functions.

The interior equipment or other components are installed independently of the frame, thereby providing for a freer interior layout of the airplane, and enabling an optimization of the individual components.

The clear definition of load introduction points in the structure may make it possible to optimally configure and develop all components.

Figure 10:
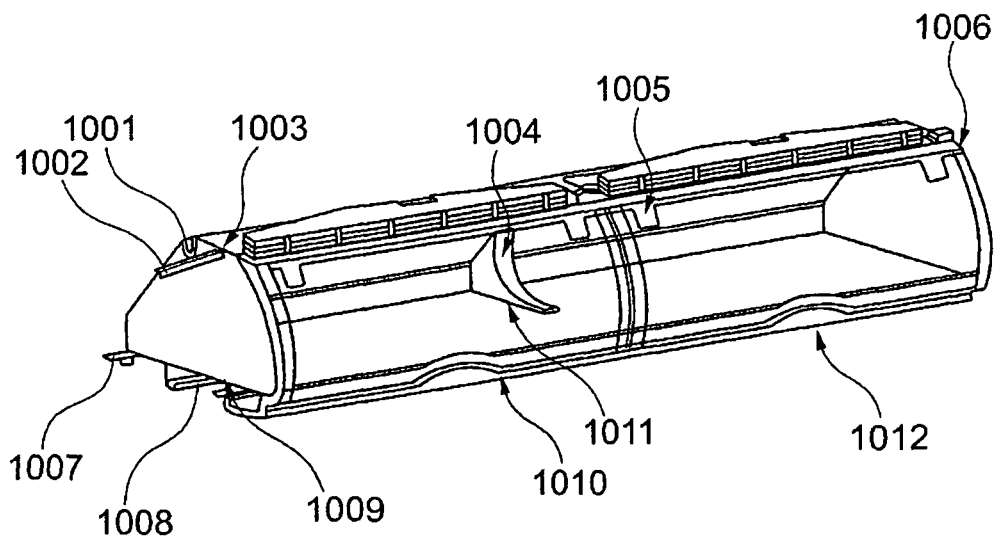
FIG. 10 shows a baggage storage compartment.

FIG. 10 shows a typical classical baggage storage compartment with a y-z suspension 1001 and 1006, a drip water seal 1002, a housing 1003, a sectioning 1004, hinges 1005, a Y-bracket 1007, an attachment rail (OUTB PSU rail) 1008, another attachment rail (INBD PSU rail) 1009, a grip rail 1010, a door 1011 and a latch 1012.

Such overhead stowage compartments, hat racks and baggage storage compartments are closed boxes, the housing of which provides bonding points for mechanical attachment to the primary structure. These bonding points are in close proximity to the frames, making it possible to shorten the length of the so-called tie rods. The upper bonding points absorb y and z-loads, the lower ones only y-loads. In addition, the x-load is absorbed at one end at the lower bonding points. FIG. 1 shows how the baggage storage compartment is secured to the primary structure, along with the corresponding load distribution.

Figure 11:
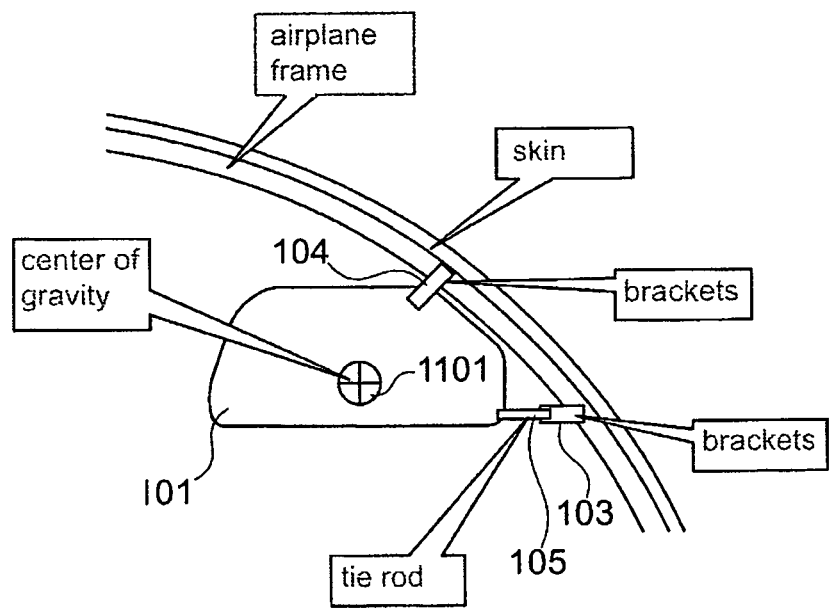
FIG. 11 shows the relative positions of the center of gravity and suspension arrangement of a baggage storage compartment.

FIG. 11 shows a diagrammatic cross sectional view of a baggage storage compartment as depicted three-dimensionally on FIG. 10 in a secured state, and reveals the relative location of the center of gravity 1101 relative to the upper attachment 104. The large lever arms relative to the center of gravity place a high load on the structure of the baggage storage compartment. The bearing forces are also very high due to the unfavorable position.

Figure 12:
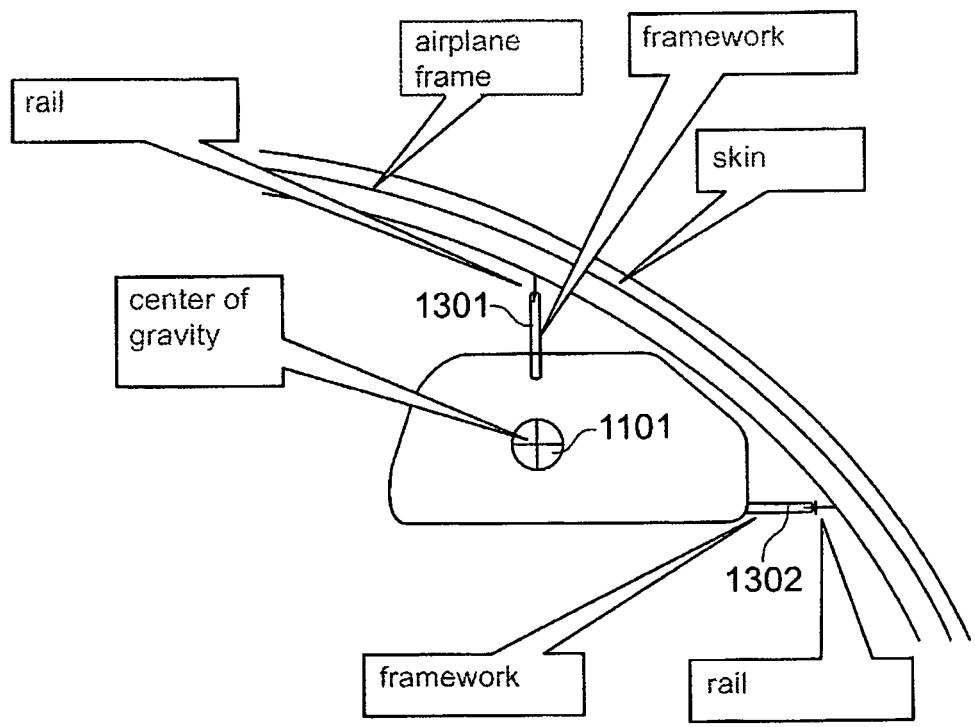
FIG. 12 shows the position of the upper suspension point according to an exemplary embodiment of the present invention.

FIG. 12 shows a diagrammatic cross sectional view depicting a bonding or suspension point 1201 for the baggage storage compartment, which essentially is located over the center of gravity 1101. Also provided is a lower suspension point 1202.

The upper bonding points 1201 are essentially located over the center of gravity. The upper attachment is designed in such a way that only z-loads are borne. The y-loads act at the lower bonding point 1202.

Bearing loads may be minimized in this way. In particular, this may enable an optimal attachment to the described longitudinal rails.

Figure 13:
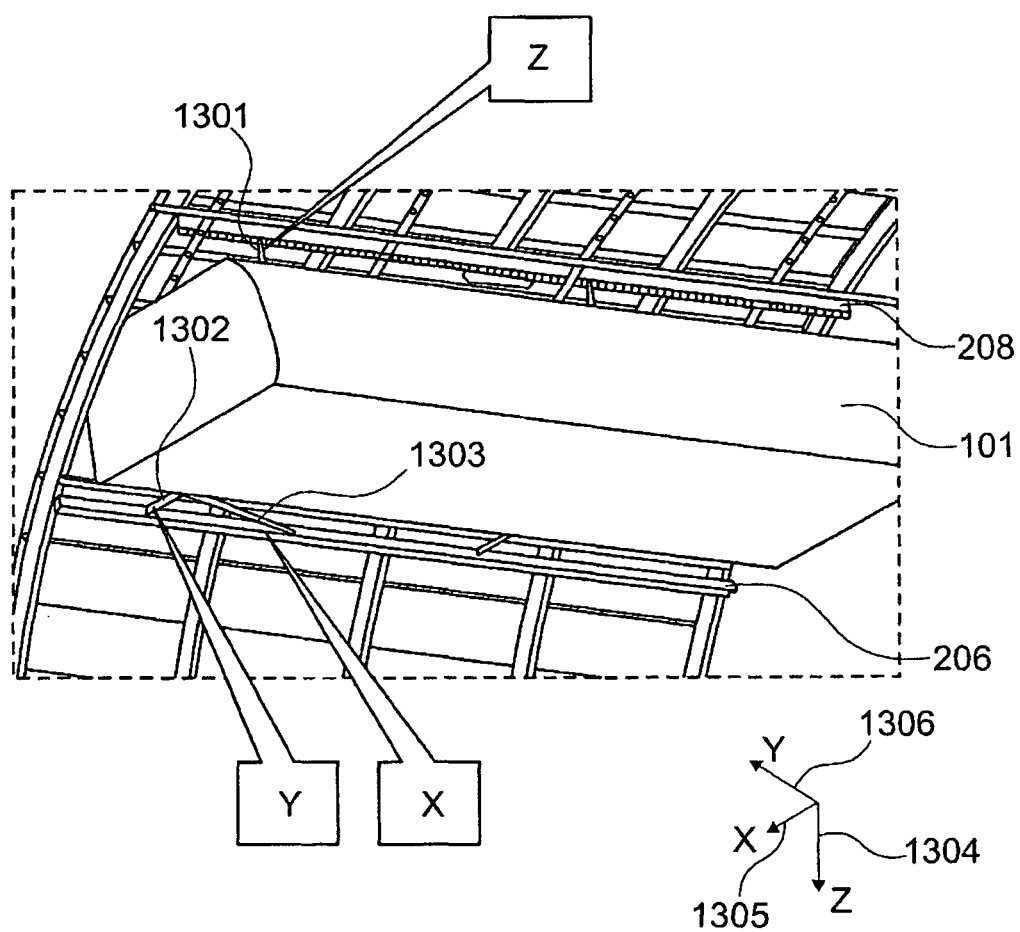
FIG. 13 shows a baggage storage compartment, which is secured to an installation system according to an exemplary embodiment of the present invention.

FIG. 13 shows how a baggage storage compartment 101 is secured to an installation system according to an exemplary embodiment of the present invention. Vertical tie rods 1301 are provided to absorb the z-loads. Also provided are rods 1302 to absorb the y-loads, and rods 1303 to absorb x- and y-loads. The x-, y- and z-direction are defined by the coordinate system 1305, 1306 and 1304.

Shifting the upper bonding points over the center of gravity may make it possible to eliminate the critical lever arms in the event of a z-crash. The forces essentially act without any torque support.

Decoupling the y-loads of the upper attachment initiates a uniaxial load case. As a result, the bearing point may be secured via a single tie rod 1301 to the overlying frame or overlaying longitudinal rail 208. A framework is not necessary.

The arising additional y-loads on the lower bonding points 1302, 1303 are relatively low, and are introduced into the frames via the rail 206.

Conventional overhead stowage compartments are closed boxes, the housing of which provide bonding points for mechanical attachment to the primary structure.

More recent overhead stowage compartments or baggage storage compartments may provide moving chutes that are secured to their housing on a fulcrum.

Figure 14:
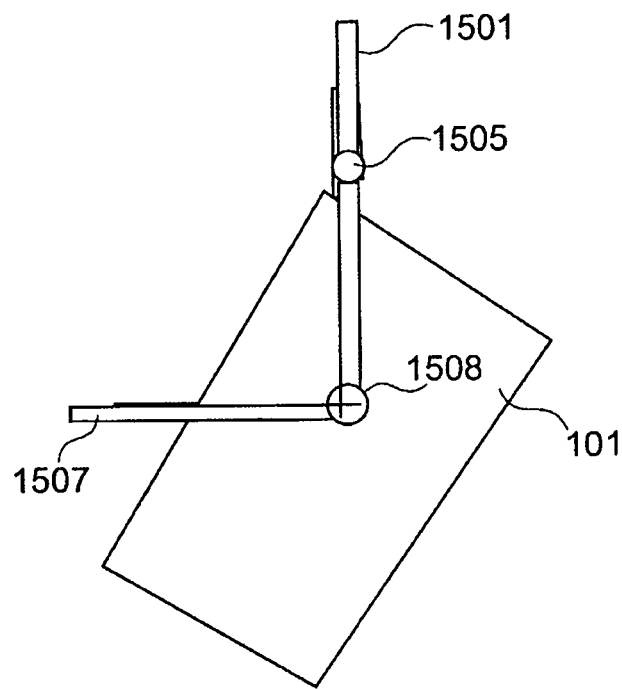
FIG. 14 shows a schematic cross sectional view of a suspension concept according to an exemplary embodiment of the present invention.

FIG. 14 shows a diagrammatic cross sectional view of such a baggage storage compartmented with moving chutes 101, which are secured to the longitudinal rails on a fulcrum 1405 on the housing of the baggage storage compartment 101 via the device 1401, 1402. One example for such a chute is the so-called "center gravity bin".

In order to save on weight and for ergonomic reasons, the primary loads are directly absorbed on the fulcrums 1405 of the chutes, so that the housing does not have to bear large loads.

Among other things, the components 1403 and 1404 are used to support the baggage storage compartment 101. 1406 depicts the lid of the baggage storage compartment 101, which faces the front when opened.

Figure 15:
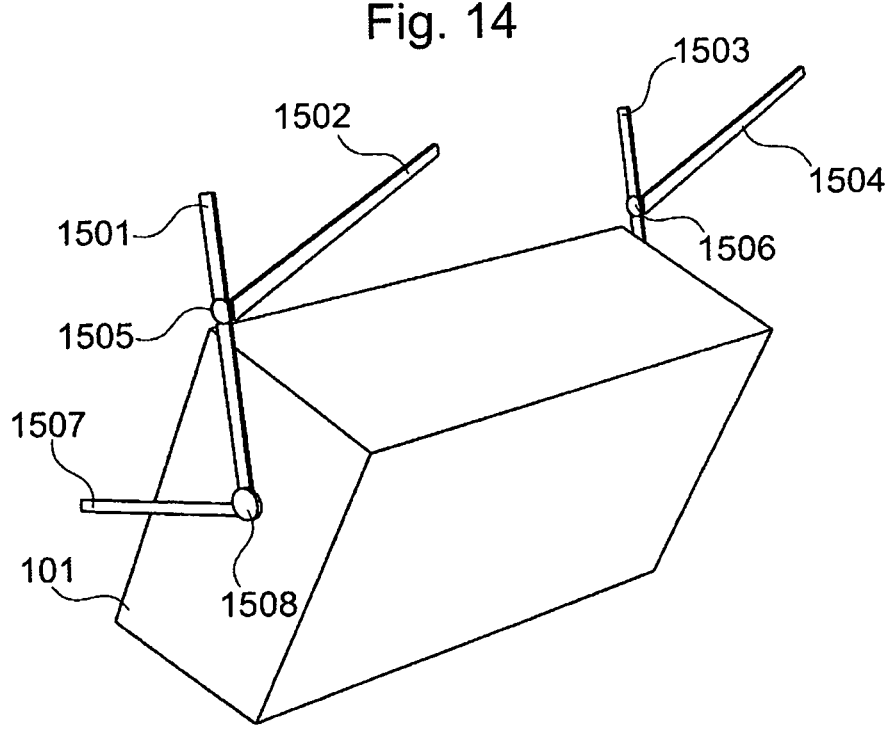
FIG. 15 shows a schematic view of a bearing framework for a baggage storage compartment according to an exemplary embodiment of the present invention.

FIG. 15 shows a portion of an installation system for a baggage storage compartment 101, which may make it possible to mount the chutes as optimally as possible. Such an optimal mounting may satisfy the following requirements:

Minimal sum of bearing loads, separation of bearing loads, fewest possible parts exposed to a transverse load, less building space between the chutes, and no cuts in the chute volume.

The bearing framework according to an exemplary embodiment of the invention exhibits an x-bearing 1502 (along the longitudinal direction of the airplane), a y-bearing 1507 (along the transverse axis of the airplane) and a z-bearing 1501 (along the vertical axis of the airplane). Also provided are joints 1505, 1506 and 1508, along with corresponding bearings 1503, 1504 on the other side of the baggage storage compartment 101.

The various bearings are then secured to the longitudinal rails or the transversal rails of the installation system.

Figure 16A:
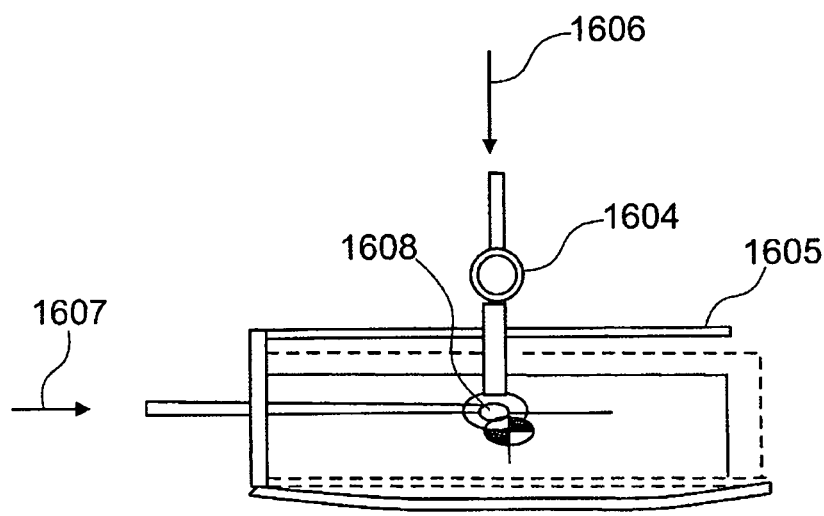
FIGS. 16A and 16B show cross sectional views of a bearing concept according to an exemplary embodiment of the present invention.
Figure 16B:
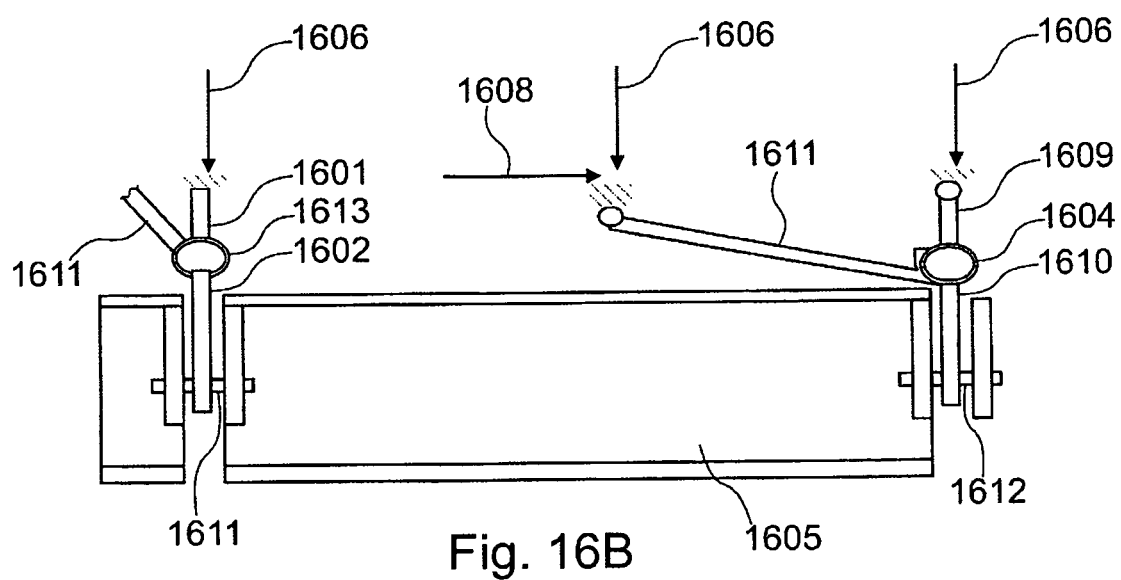

FIGS. 16A and 16B show how the bearing framework functions. FIG. 16A is cross section in viewing direction X (flight direction), and FIG. 16B provides a depiction in viewing direction Y (side view).

The tie rod 1601 and flexural boom 1602 are joined together via the hinge 1613, and connected via the axes 1611 of the chute 1605. The rod 1602 is a flexural boom. The very same applies to the rod 1610 on the other side, which is pivoted with the chute via the hinge 1612.

The tie rod 1609 is joined with the flexural rod 1610 via the axis 1604. In addition, a tie rod 1611 is connected with the hinge 1604, which is designed to absorb forces in the X-direction 1608. The arrows 1606 show forces in the Z-direction, which can be absorbed by the corresponding tie rods 1601, 1611 and 1609.

A typical length for such a chute 1605 measures 110 cm. However, other sizes can be provided as well.

The arrow 1607 is a force arrow directed in the Y-direction. Arrows 1606, 1607 and 1608 denote the load absorption directions.

The bearing framework according to the invention may enable a minimization of bearing loads and a reduction in weight. Further, it enables the creation of uniaxially loaded bonding points to the structure. In addition, it may enable uniaxial flexural states during the use of rails, and hence highly integrated rails, which are the subject matter of the installation system.

An advantage to the baggage storage compartments with movable chutes may be that only a single transversely loaded part is provided, which here exhibits a shallow depth in the X-direction given a high space utilization for baggage, and that no cuts need be made in the chute volumes.

Aspects of the present invention will be described using several preferred embodiments of the rail according to an exemplary embodiment of the invention. However, the designs presented apply both for an aircraft that has a corresponding rail, and for the use of a corresponding rail in an aircraft.

Figure 17:
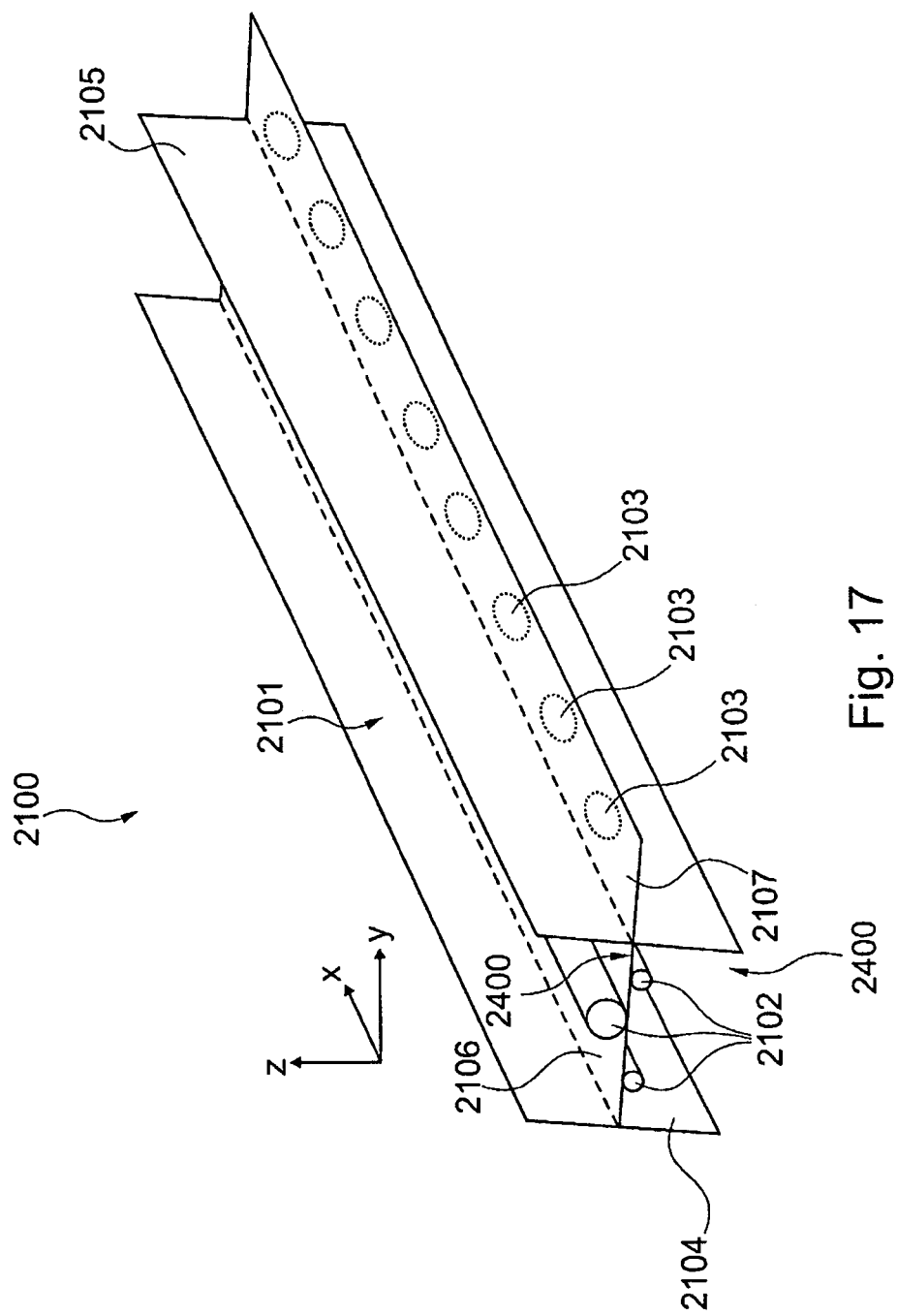
FIG. 17 shows a schematic, three-dimensional view of the rail according to an exemplary embodiment of the present invention.

FIG. 17 here presents a diagrammatic three-dimensional view of a rail 2100 according to another exemplary embodiment of the present invention. An attachment area 2101 can be used to integrate the rail 2100 into the primary structure of the aircraft. For example, this can be accomplished by way of screwed connections, clamping or adhesive bonding to the frames of the aircraft. For example, the rail according to the invention, as shown on FIG. 21, can be clamped into a fitting counter-rail over its first perpendicular area 2104. A screwed or clamped joint is also possible here, however. Situated between the first perpendicular area 2104 and second perpendicular area 2105 is the first horizontal area 2106. The cable installation space 2400 is located both above and below the horizontal area. The cable installation space can here be used for the most varied of media, e.g., cables, pipe conduits, mechanical elements, media such as coolant, water, air and hydraulic oil, thereby providing an expanded functionality. This entire area between the perpendicular areas can be used as an area screened against electromagnetic radiation given a correspondingly conductive configuration. This area can further be used to incorporate cable channels 2102 (these can be individual cables, cable looms or also channels) into the rail for purposes of integrating electrical functionalities. As a result, cables can be routed inside the rails, and electrical screening can be provided given a corresponding cable channel design. It is here possible for various or several cable channels to be installed on the upper and lower side of the first horizontal area 2106. The second perpendicular area 2105 is followed by a second horizontal, final area 2107. As clearly evident here, the mechanical bonding points 2103 lie in this horizontal area 2107. The distance between the bonding points 2103 can here be selected in such a way as to enable inch-by-inch installation of cabin components. This provides a standardization method for cabin architectures, while simultaneously allowing the provision of coordinates for a grid. However, other distances are also possible. A clear and rapidly adaptable architecture thus takes into account the requirements for an accelerated assembly and simplified conversion processes in the cabin area. This reversible and frequently modifiable systems installation is highly advantageous precisely in the increasingly important CFP fuselages of aircraft, in which an additional borehole within the fuselage can translate into a loss in stability during conversion work. This continuous provision of mechanical bonding points yields advantages relating to the capability to secure the frame grid independently in both the longitudinal and peripheral direction. In addition to these advantages, increasing importance is being attached to a potential savings in weight via the integration of electrical functionalities into the rail.

Figure 18:
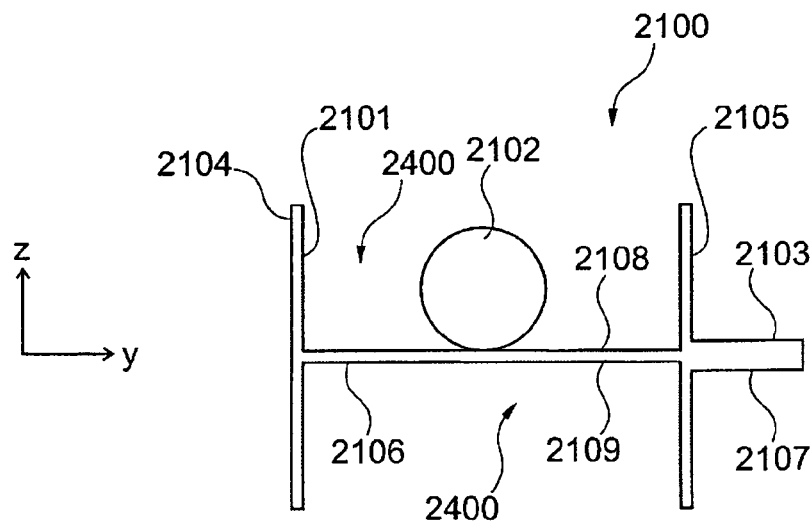
FIG. 18 shows a schematic, two-dimensional view of the rail, cross section perpendicular to the longitudinal axis of the rail according to an exemplary embodiment of the present invention.

FIG. 18 shows a diagrammatic, two-dimensional view of a rail according to another exemplary embodiment of the present invention, wherein the rail exhibits an expanded H-profile in cross section perpendicular to the longitudinal axis of the rail, here the x-axis. Shown here is a first perpendicular area 2104 and a second perpendicular area 2105, between which is located the first horizontal area 2106 with an upper side 2108 and a lower side 2109. The cable installation space 2400 is here formed between the two perpendicular areas both above and below the horizontal area. In this case, the cable installation space can be used for the most varied of media, for example cables, pipe conduits, mechanical elements, media, such as coolants, water, air, and hydraulic oil, thereby providing an expanded functionality. This entire area between the perpendicular areas can be used as an area screened against electromagnetic radiation, given a correspondingly conductive configuration of the material that borders the cable installation area 2400. The rail 2100 can be secured in the aircraft by way of the attachment area 2101. This attachment can be realized by means of a screwed joint, clamping or adhesive bond in any mechanical embodiment. The second horizontal area 2107 that seals the rail to the inside of the cabin exhibits the mechanical bonding points to which the loads comprising the system installation are secured, e.g., cabin components and other elements. The second horizontal area 2107 is here designed with mechanical bonding points having a greater thickness, since the loads are introduced in the primary structure of the aircraft by way of this area. The cable channel 2102 here shown on the upper side 2108 of the rail 2100 according to the invention can also be located on the lower side 2109 or both sides at the same time, for example.

Figure 19:
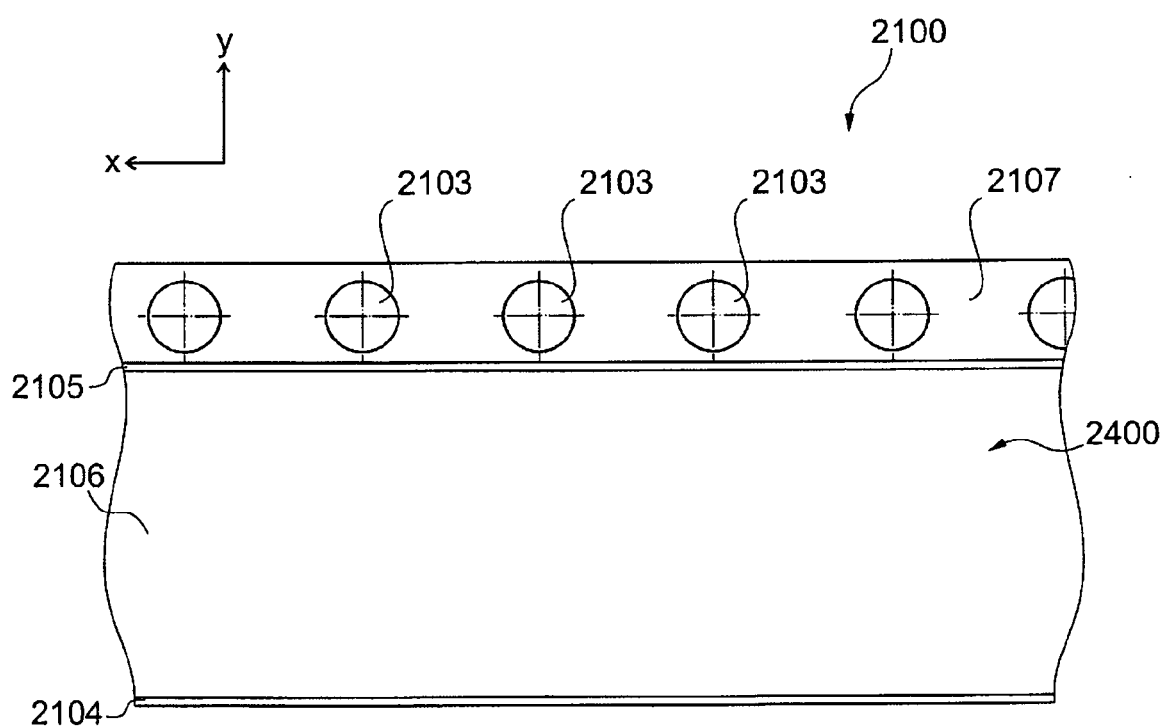
FIG. 19 shows a schematic, two-dimensional view according to an exemplary embodiment of the present invention, as seen from above on the xy-plane of the rail.

FIG. 19 shows a diagrammatic, two-dimensional view of a rail according to another exemplary embodiment of the present invention, wherein FIG. 19 provides a top view of the xy-plane of the rail. Visible here is the first perpendicular area 2104 and second perpendicular area 2105, which the second horizontal area 2107 with the mechanical bonding points 2103 abuts. The first horizontal area 2106 provides a cable installation area 2400, and is shown without a cable channel in this exemplary embodiment, which does not contradict a configuration of this exemplary embodiment with a cable channel above or below the first horizontal area 2106.

Figure 20:
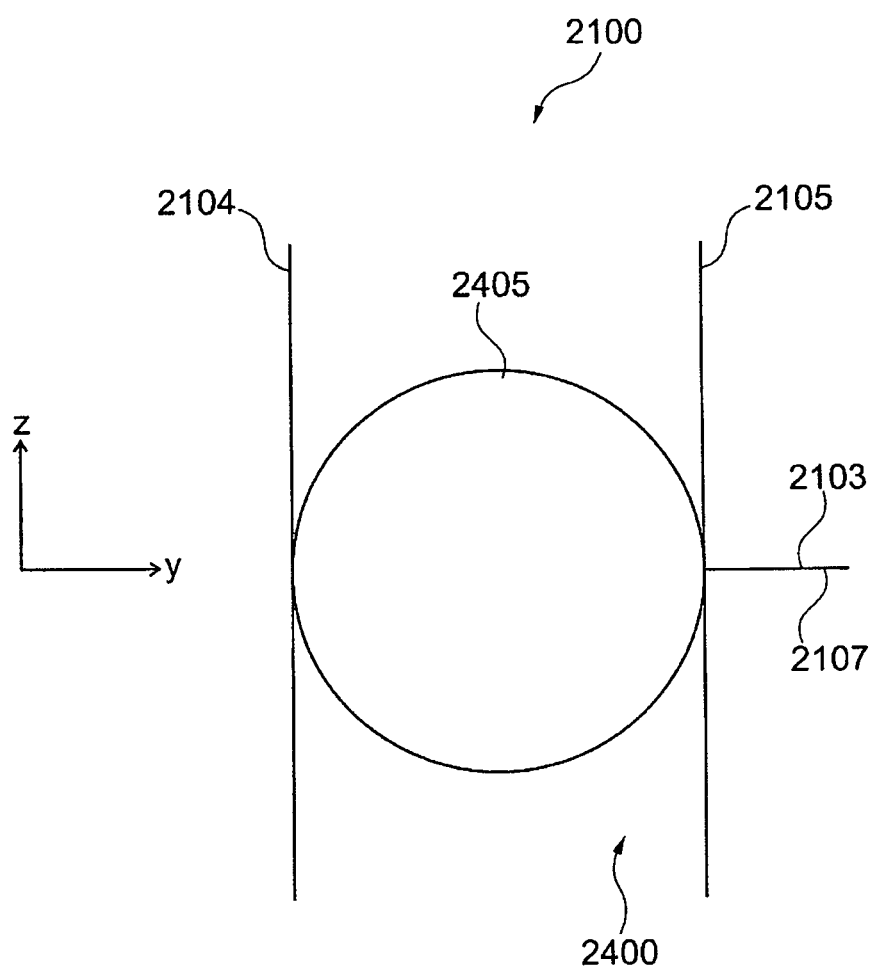
FIG. 20 shows a schematic, two-dimensional view according to an exemplary embodiment of the present invention, in cross section perpendicular to the longitudinal axis.

FIG. 20 shows a diagrammatic, two-dimensional view of a rail according to an exemplary embodiment of the present invention, in which the rail is depicted in cross section perpendicular to the longitudinal axis of the rail. A first perpendicular area 2104 and a second perpendicular area 2105 are here visible, and enclose the cable installation space 2400. The cable installation space 2400 here reveals a cable channel or a pipe 2405, so that the cable installation space is completely filled out by the cable channel or pipe. In this case, the cable channel or pipe is unlimited to the top in the z-direction and to the bottom in the z-direction. In addition to this embodiment, a configuration with several individual cable channels or pipes in the area between the perpendicular areas 2104 and 2105 is also conceivable. As opposed to the preceding exemplary embodiments of the invention, the first horizontal area is here missing. The second, final horizontal area 2107 with the mechanical bonding points 2103 is again designed in such a way that the loads arising from system installation, such as cabin components and other elements, for example seats, seat groups, closets, recreation and sleep modules, can be introduced via the bonding points into the rail, and hence into the primary structure of the aircraft. The cable channel 2405 can here be set up to screen an electrical conductor within the channel, wherein the cable channel is then referred to as a raceway. In this case, the cable channel can be made of the most varied of materials, wherein it must consist at least partially of an electrically conductive material during the preparation of a screen. In this and any other exemplary embodiment of the invention, the material for the remaining rail can be freely selected in such a way as to withstand the forces introduced by the loads to be secured without damage. Use of a pipe 2405 enables the integration of additional functionalities. The expanded functionality can involve utilizing the rail as a part of the air-conditioning piping, for example. Another possibility is to use the rail as part of hydraulic lines. Yet another possible integrated functionality involves having the rail serve as part of the mechanical flight controller.

Figure 21:
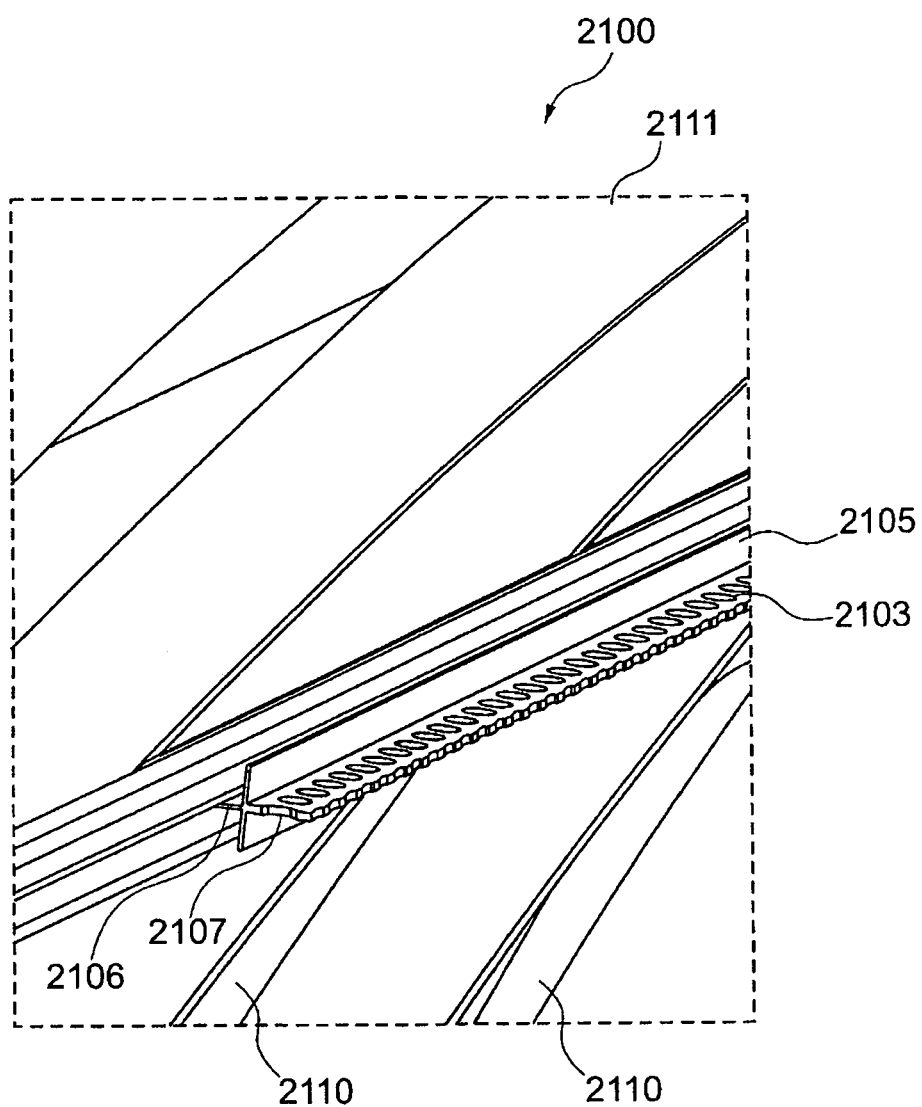
FIG. 21 shows a schematic, three-dimensional view of the rail according to the invention on frames in the airplane.

FIG. 21 shows a diagrammatic, three-dimensional view of a rail according to another exemplary embodiment of the present invention, wherein this exemplary embodiment clearly depicts the attachment of the rail according to the invention to the frames of the aircraft 2110. As clearly evident, the mechanical bonding points 2103 extending along the longitudinal direction of the rail in the cabin area enable a continuous attachment independently of the frame grid in a longitudinal and peripheral direction of cabin components and elements. The second horizontal area 2107 that accommodate the mechanical bonding points 2103 can be used to rapidly mount the loads from the system installation on coordinates of a prescribed grid. This enables an accelerated assembly and shorter conversion processes, wherein quickly adaptable architectures of the cabin design can be drawn upon in the process. Also clearly evident on FIG. 21 is that fixing and attaching additional loads to the rails eliminates the need for assembly on the fuselage 2111 of the aircraft. This is of significant importance precisely in CFP fuselages or even hybrid fuselages comprised of CFP and metal, since additional drilling can here trigger major instability within the fuselage.

Figure 22:
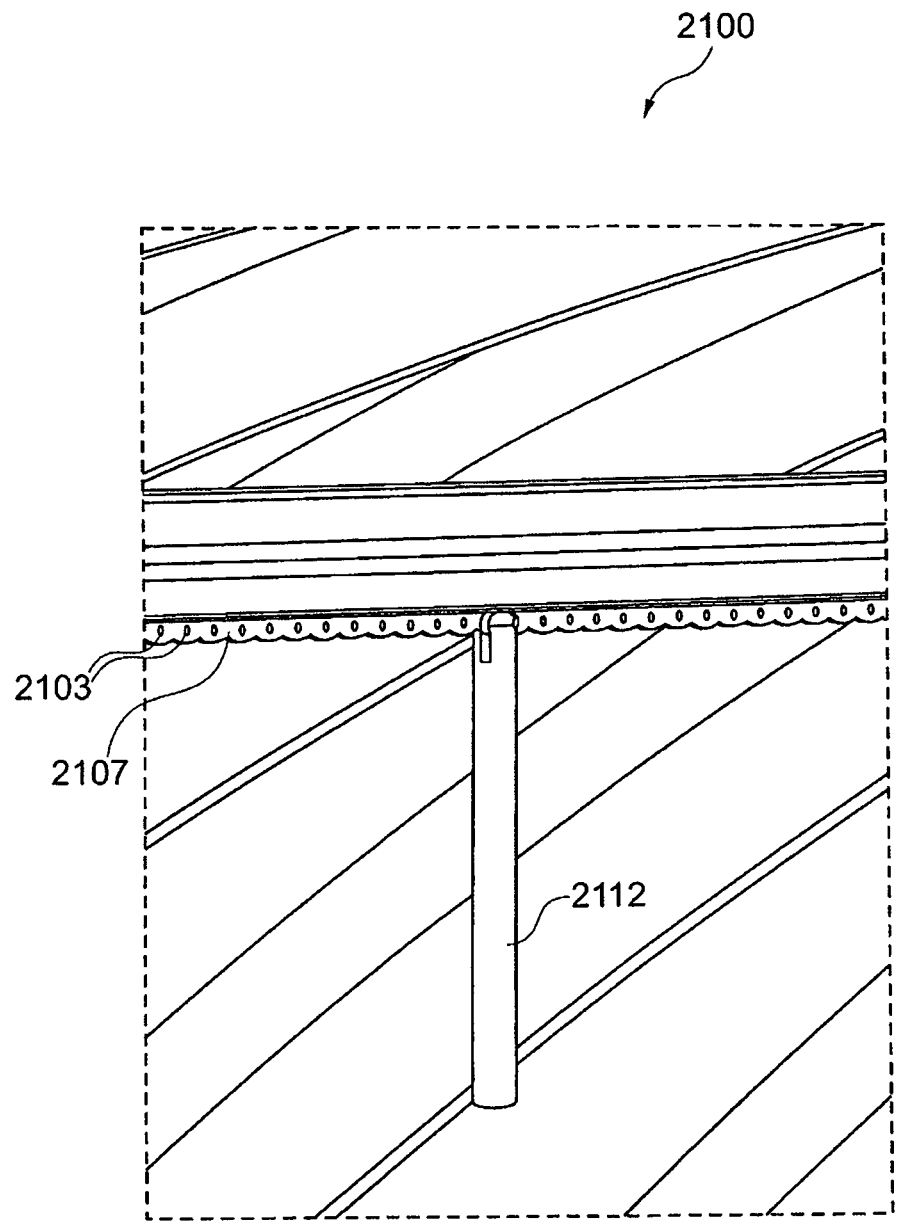
FIG. 22 shows a schematic, three-dimensional view of the rail according to the invention on frames, with load introduction via a denoted connecting rod.

FIG. 22 shows another diagrammatic, three-dimensional view of a rail according to another exemplary embodiment of the present invention, which depicts a front view of the attachment of a component 2112 to a second horizontal area 2107 of the rail via mechanical bonding points 2103.

Figure 23:
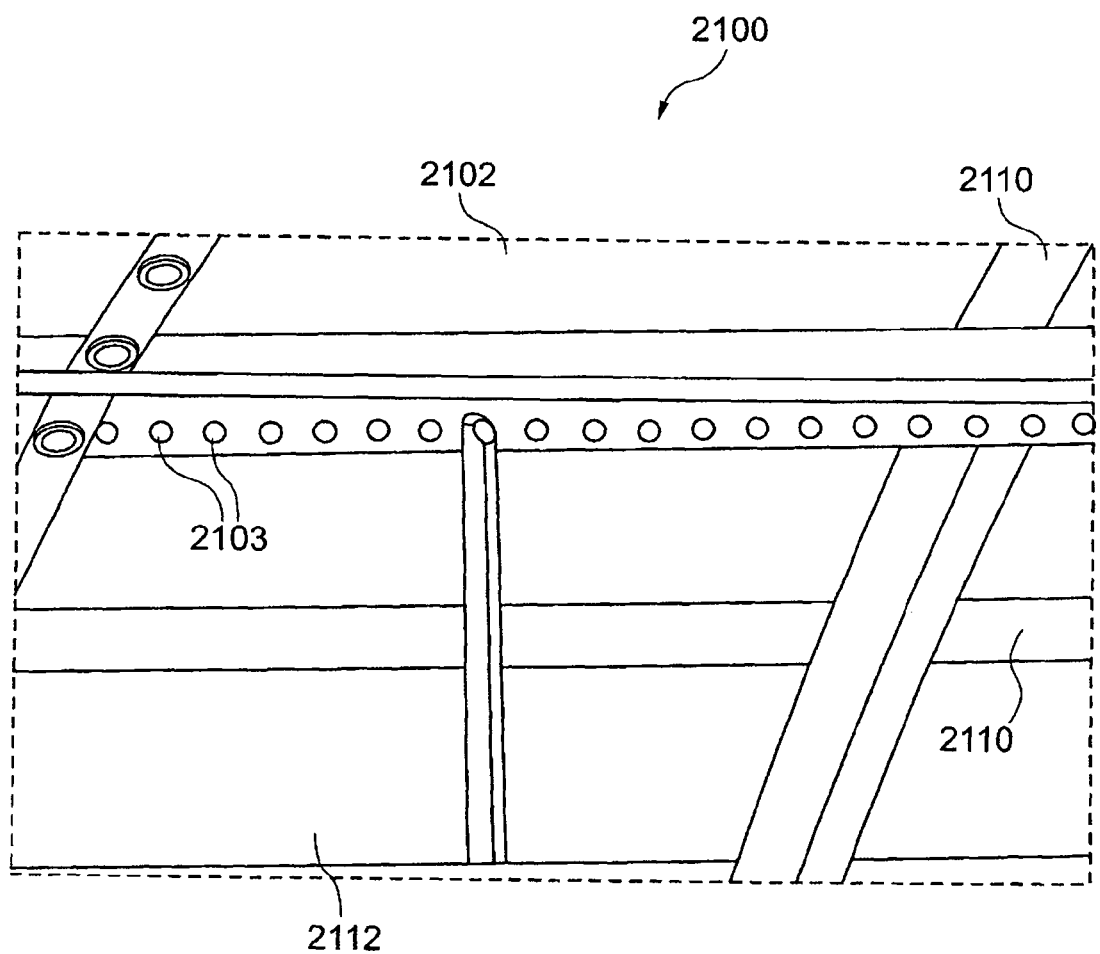
FIG. 23 shows a schematic, three-dimensional view of the rail according to the invention on frames, with load.

FIG. 23 shows a three-dimensional view of a rail 2100 according to another exemplary embodiment of the present invention, which is secured to frames 2110 of an aircraft, and exhibits a cable channel for guiding and screening the cables, providing a return line network or providing a Faraday cage. It shows the mechanical bonding points 2103 to which a load 2112 is secured, for example.

Figure 24:
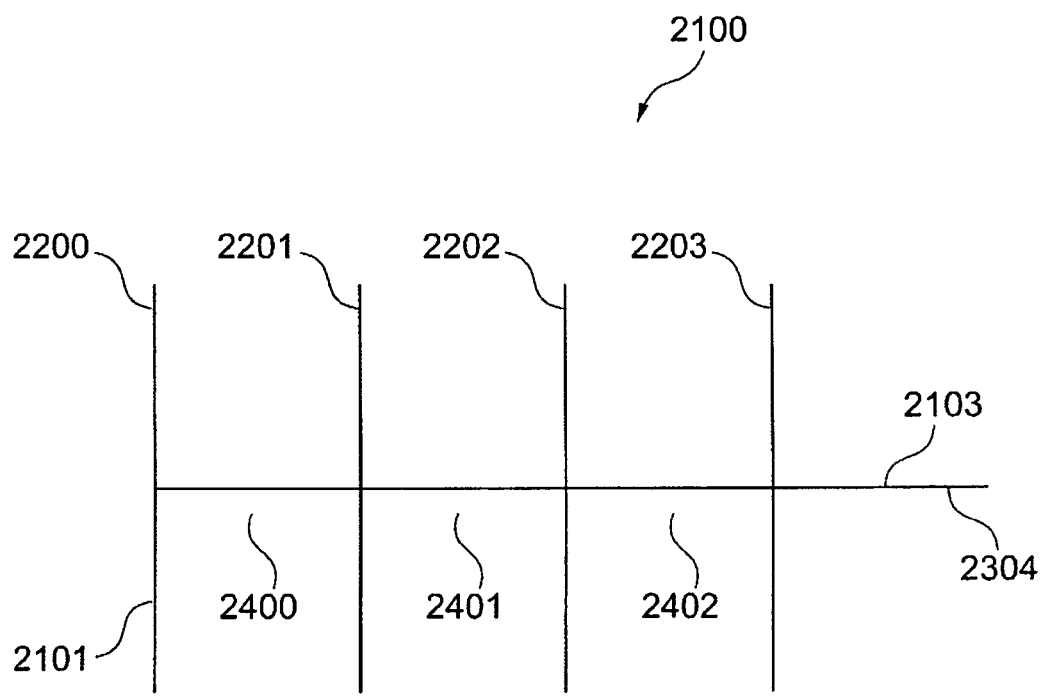
FIG. 24 shows a schematic, three-dimensional view of the rail according to the invention based on an exemplary embodiment of the present invention.

FIG. 24 shows a three-dimensional view of a rail 2100 according to another exemplary embodiment of the present invention, which provides several cable installation spaces 2400 to 2402 by way of several perpendicular areas 2200 to 2203. This comb-like design of the rail can serve to accommodate cables, pipe conduits, mechanical elements or control elements, media, such as coolant, water, air or hydraulic oil, in separate installation spaces. In addition, various functionalities can be separately integrated within different cable installation spaces. A perpendicular area 2304 with the mechanical bonding points 2103 here makes it possible to attach loads to the rail. The attachment area 2101 allows the rail to be secured to the aircraft. This exemplary embodiment of the rail according to the invention shows three cable installation areas. However, this does not preclude the possibility of any number of cable installation spaces in another configuration.

It must additionally be noted that "encompassing" does not preclude any other elements or steps, and that "a" or "one" does not exclude a plurality. Let it also be noted that features or steps described with reference to one of the above exemplary embodiments may also be used in combination with other features or steps from other exemplary embodiments described above. Reference numbers in the claims are not to be construed as limiting.

The invention claimed is:

1. A rail for cabin and system installation in an aircraft, the rail comprising:
a cable installation space;
an attachment area arranged at a first side of the cable installation space;
a mounting area arranged at a second side of the cable installation space, which second side is arranged opposite to the first side, such that the cable installation space is arranged between the attachment area and the mounting area and
at least one mechanical bonding point;
wherein the attachment area comprises a first perpendicular area, which first perpendicular area extends in a longitudinal direction of the rail along the whole rail;
wherein the attachment area is configured to attach the rail to a primary structure of the aircraft;
wherein the mounting area extends as a horizontal area in a longitudinal direction of the rail along the whole rail and accommodates the at least one mechanical bonding point;
wherein the at least one mechanical bonding point is configured to mechanically attach loads to the rail;
wherein the cable installation space is configured to provide an integrated, expanded functionality;
wherein the mounting area extends generally orthogonally to the attachment area, and
wherein the attachment area comprises a generally planar face and is configured such that the planar face directly attaches to the primary structure for attaching the rail to the primary structure.

2. The rail of claim 1,
wherein the expanded functionality is an electrical functionality.

3. The rail of claim 1,
wherein the cable installation space comprises at least partially an electrically conductive jacket;
wherein the jacket is configured to electromagnetically screen an electrical conductor inside the cable installation space.

4. The rail of claim 1,
wherein at least portions of the rail are configured as part of a return line network.

5. The rail of claim 1,
wherein the rail comprises an expanded H-profile in cross section perpendicular to a longitudinal axis of the rail;
wherein the expanded H-profile comprises, at a boundary section, the first perpendicular area abutted by a first horizontal area up to a second perpendicular area;
wherein the first horizontal area comprises a first width between the first and the second perpendicular area, thereby forming a cable installation space both on an upper side and lower side of the horizontal area;
wherein the mounting area comprises a second, final, horizontal area abuting the second perpendicular area, and accommodating the at least one mechanical bonding point;
wherein the first horizontal area is perpendicular to the first and the second perpendicular areas and extends parallel to the longitudinal axis of the rail; and
wherein the second, final, horizontal area is perpendicular to the second perpendicular area and extends parallel to the longitudinal axis of the rail.

6. The rail of claim 1,
wherein the rail comprises the first and the second perpendicular areas in cross section perpendicular to a longitudinal axis of the rail;
wherein the cable installation space is arranged between the perpendicular areas as a load-bearing element of the rail; and wherein the mounting area comprises a final, horizontal area abuting the second perpendicular area, and accommodating the at least one mechanical bonding point; and wherein the final, horizontal area is perpendicular to the second perpendicular area and extends parallel to the longitudinal axis of the rail.

7. The rail of claim 1, wherein the rail comprises at least partially an electrically conductive material.

* * * * *